United States Patent
Lin et al.

(10) Patent No.: US 10,461,978 B2
(45) Date of Patent: Oct. 29, 2019

(54) PHYSICAL LAYER PROTOCOL DATA UNIT TRANSMISSION METHOD AND APPARATUS

(71) Applicant: HUAWEI TECHNOLOGIES CO., LTD., Shenzhen, Guangdong (CN)

(72) Inventors: Meilu Lin, Shenzhen (CN); Yun Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/834,435

(22) Filed: Dec. 7, 2017

(65) Prior Publication Data

US 2018/0102929 A1    Apr. 12, 2018

Related U.S. Application Data

(63) Continuation of application No. PCT/CN2015/081208, filed on Jun. 10, 2015.

(51) Int. Cl.
| | |
|---|---|
| *H04L 27/26* | (2006.01) |
| *H04L 5/00* | (2006.01) |
| *H04W 84/12* | (2009.01) |
| *H04L 29/08* | (2006.01) |

(52) U.S. Cl.
CPC ........ *H04L 27/2626* (2013.01); *H04L 5/0053* (2013.01); *H04L 5/0094* (2013.01); *H04L 27/2605* (2013.01); *H04L 27/2613* (2013.01); *H04L 27/2666* (2013.01);
(Continued)

(58) Field of Classification Search
None
See application file for complete search history.

(56) References Cited

U.S. PATENT DOCUMENTS

| | | |
|---|---|---|
| 2005/0226270 A1 | 10/2005 | Liu et al. |
| 2012/0207192 A1 | 8/2012 | Zhang et al. |
| 2012/0314653 A1 | 12/2012 | Liu |

(Continued)

FOREIGN PATENT DOCUMENTS

| | | |
|---|---|---|
| CN | 102165726 A | 8/2011 |
| CN | 102696270 A | 9/2012 |

(Continued)

OTHER PUBLICATIONS

Extended European Search Report issued in European Application No. 15894619.4 dated Mar. 22, 2018, 8 pages.
(Continued)

*Primary Examiner* — Anh Vu H Ly
(74) *Attorney, Agent, or Firm* — Fish & Richardson P.C.

(57) ABSTRACT

Methods, apparatus, and systems for a physical layer protocol data unit (PPDU) transmission are provided. In one aspect, a method includes: generating a physical layer protocol data unit (PPDU) including a signal extension (SE) field arranged after a last orthogonal frequency division multiplexing (OFDM) symbol of a plurality of OFDM symbols, the PPDU including indication information in a high efficiency signaling field (HE-SIG), the indication information being generated based on a symbol length of the SE field and configured to indicate whether a receive end needs to adjust a calculated quantity of the plurality of OFDM symbols, and sending the PPDU to the receive end.

22 Claims, 6 Drawing Sheets

(52) U.S. Cl.
CPC ........... *H04L 69/323* (2013.01); *H04W 84/12* (2013.01); *H04L 5/0007* (2013.01)

(56) References Cited

U.S. PATENT DOCUMENTS

| | | |
|---|---|---|
| 2014/0233667 A1 | 8/2014 | Grandhi |
| 2014/0328249 A1 | 11/2014 | Vermani et al. |
| 2015/0146808 A1 | 5/2015 | Chu et al. |
| 2016/0242177 A1* | 8/2016 | Seok ................. H04W 72/0446 370/328 |
| 2016/0261724 A1* | 9/2016 | Lee .......................... H04J 11/00 370/328 |
| 2016/0374017 A1* | 12/2016 | Stacey .............. H04W 52/0216 370/328 |
| 2017/0086212 A1* | 3/2017 | Kim ...................... H04W 72/04 370/328 |
| 2018/0091349 A1* | 3/2018 | Lin ......................... H04L 27/26 370/328 |

FOREIGN PATENT DOCUMENTS

| | | |
|---|---|---|
| CN | 103718596 A | 4/2014 |
| EP | 3282660 A1 | 2/2018 |
| WO | 2015069811 A1 | 5/2015 |

OTHER PUBLICATIONS

International Search Report and Written Opinion in International Application No. PCT/CN2015/081208, dated Mar. 8, 2016, 20 pages.

Office Action issued in Chinese Application No. 201580079146.2 dated Jul. 4, 2019, 12 pages (with English translation).

* cited by examiner

PHYSICAL LAYER PROTOCOL DATA UNIT TRANSMISSION METHOD AND APPARATUS

CROSS-REFERENCE TO RELATED APPLICATIONS

This application is a continuation of International Application No. PCT/CN2015/081208, filed on Jun. 10, 2015. The disclosures of the aforementioned application is hereby incorporated by reference in their entireties.

TECHNICAL FIELD

The present invention relates to the field of communications technologies, and in particular, to a physical layer protocol data unit transmission method and apparatus.

BACKGROUND

To improve data transmission efficiency in a WLAN (wireless local area network), a 4× symbol length is introduced into a next-generation WLAN standard 802.11ax, and correspondingly, an 802.11a/n/ac symbol is referred to as a 1× symbol.

The 4× symbol length means that a data length is 12.8 μs in an OFDM (orthogonal frequency division multiplexing) symbol. Correspondingly, a proportion that a CP of 3.2 us accounts for in an OFDM symbol changes to (3.2/(3.2+12.8))=20%, so that transmission efficiency is effectively improved. It may be learned that a time domain transmission time of the data part changes from 3.2 us to 12.8 us and is increased by four times. Correspondingly, in a frequency domain, bandwidth of each subcarrier is decreased by four times because smaller bandwidth indicates a longer transmission time. Specifically, for 802.11ac, there are 64 subcarriers on a bandwidth of 20 MHz, and the 64 subcarriers are corresponding to 64-point FFT; there are 128 subcarriers on a bandwidth of 40 MHz, and the 128 subcarriers are corresponding to 128-point FFT; there are 256 subcarriers on a bandwidth of 80 MHz, and the 256 subcarriers are corresponding to 256-point FFT. For 802.11ax, there are 256 subcarriers on 20 MHz, and the 256 subcarriers are corresponding to 256-point FFT; there are 512 subcarriers on 40 MHz, and the 512 subcarriers are corresponding to 512-point FFT; there are 1024 subcarriers on 80 MHz, and the 1024 subcarriers are corresponding to 1024-point FFT.

A bandwidth of 20 MHz is used as an example, the 64 subcarriers in 802.11ac include 52 data subcarriers and four pilot subcarriers, and the 256 subcarriers in 802.11ax include 234 data subcarriers and eight pilot subcarriers. If a same MCS (Modulation and Coding Scheme) is used, a volume of data that can be transmitted in 802.11ax may be greater than four times that can be transmitted in 802.11ac, because (234>4×52). It is the same for 40 MHz and 80 MHz.

After the 4× symbol length is introduced, a time required for a receive end to process each OFDM symbol increases. A processing process at the receive end mainly includes: 1. FFT Fast Fourier Transform; 2. demapping; and 3. channel decoding. The most time consuming part is channel decoding. The time for channel decoding increases because the data volume in each OFDM symbol increases. This processing delay becomes very severe in a case of large bandwidth (80 MHz or the like) and a high MCS (for example, MCS9).

When receiving a data frame or a control frame that requires an immediate response (a response after a SIFS=16 us), the receive end needs to first process the data frame or the control frame, and then switch from a receiving state to a sending state. These two parts need to be completed within a SIFS (Short Interframe Space) time. For a 1× symbol length (that is, an 802.11a/n/ac frame), SIFS duration of 16 us is sufficient for the receive end to complete data processing and state switching. However, for a 4× symbol length (that is, an 802.11ax frame), data processing may cause a relatively long delay. Consequently, in a case of current SIFS duration of 16 us, the receive end cannot complete data processing and state switching.

SUMMARY

The present invention provides a physical layer protocol data unit transmission method and apparatus, to resolve a problem that a receive end cannot complete data processing and state switching in current SIFS duration of 16 us because data processing at the receive end causes a relatively long delay.

According to a first aspect, an embodiment of the present invention provides a physical layer protocol data unit PPDU transmission method that is applied to a wireless local area network and includes: generating a physical layer protocol data unit PPDU, where the PPDU includes a signal extension SE field, the SE field is after the last orthogonal frequency division multiplexing OFDM symbol that carries useful information, the PPDU includes indication information, the indication information is in a high efficiency signaling field HE-SIG and the indication information I is generated based on a symbol length of the SE field and is used to indicate whether a receive end needs to adjust a calculated quantity of OFDM symbols; and sending the PPDU.

According to another aspect, a physical layer protocol data unit PPDU transmission method is correspondingly provided, including: receiving a physical layer protocol data unit PPDU, where the PPDU includes a signal extension SE field, the SE field is after the last orthogonal frequency division multiplexing OFDM symbol that carries useful information, the PPDU includes indication information, the indication information is in a high efficiency signaling field HE-SIG and the indication information I is generated based on a symbol length of the SE field and is used to indicate whether a receive end needs to adjust a calculated quantity of OFDM symbols; and parsing the PPDU to obtain a quantity M1 of OFDM symbols transmitted by the PPDU.

For working principles and other advantages of the methods, refer to methods in the Description of Embodiments, and details are not described herein.

According to the embodiments of the present invention, in a process of transmitting a physical layer protocol data unit PPDU, a length of an SE can be indicated by using few bits. By means of the embodiments of the present invention, not only a receive end can quickly complete data processing and state switching by using the SE, but also related information overheads can be further reduced.

DESCRIPTION OF EMBODIMENTS

Figure 1:
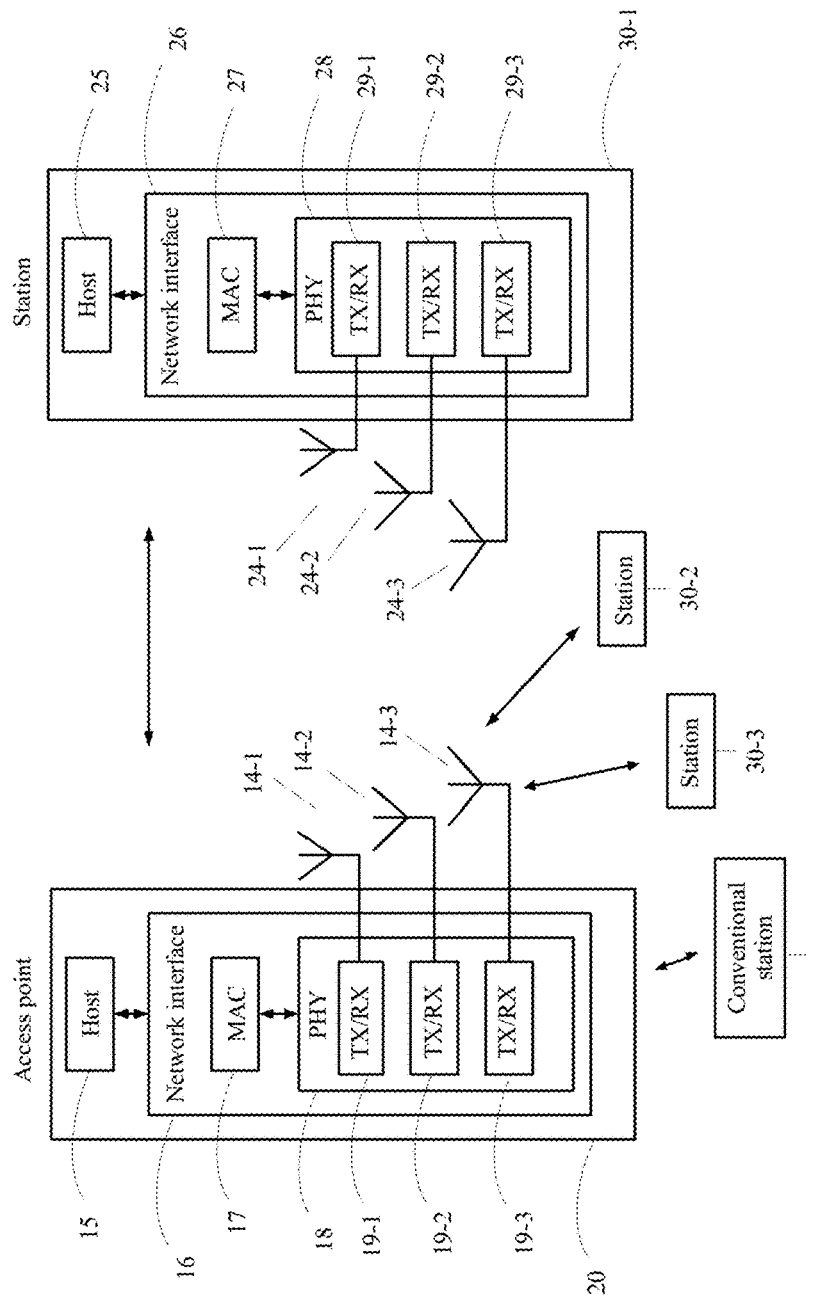
FIG. 1 is an application scenario diagram according to an embodiment of the present invention.

To make the objectives, technical solutions, and advantages of the present invention clearer, the following further describes the embodiments of the present invention in detail with reference to the accompanying drawings. To make the present invention be comprehensively understood, many specific details are mentioned in the following detailed descriptions. However, it should be understood by a person skilled in the art that, implementation of the present invention may not need these specific details. In other embodiments, well-known methods, processes, components, and circuits are not described in detail, so as to avoid unnecessarily obscuring the embodiments. Apparently, the described embodiments are some rather than all of the embodiments of the present invention. All other embodiments obtained by a person of ordinary skill in the art based on the embodiments of the present invention without creative efforts shall fall within the protection scope of the present invention.

The embodiments of the present invention may be applied to a WLAN. Standards currently used for the WLAN are Institute of Electrical and Electronics Engineers (IEEE) 802.11 series. The WLAN may include multiple basic service sets (BSSs). Nodes in the basic service set are stations STA. The stations include access point (AP) stations and non-access point stations (Non-AP STA). Each basic service set may include one AP and multiple non-AP STAs associated with the AP.

The access point station is also referred to as an access point for wireless access, a hotspot, or the like. The AP is an access point by using which a mobile user accesses a wired network, is mainly deployed in a home, a building, or a park, and generally has a coverage radius ranging from tens of meters to hundreds of meters. Certainly, the AP may also be deployed outdoors. The AP is equivalent to a bridge connecting a wired network and a wireless network, and a main function of the AP is to connect clients in a wireless network and then connect the wireless network to a wired network. Specifically, the AP may be a terminal device or a network device with a Wireless Fidelity (WiFi) chip. Optionally, the AP may be a device that supports an 802.11ax standard. Further optionally, the AP may be a device that supports various WLAN standards such as 802.11ac, 802.11n, 802.11g, 802.11b, and 802.11a.

The non-AP STA may be a wireless communications chip, a wireless sensor, or a wireless communications terminal, for example: a mobile phone that supports a WiFi communication function, a tablet computer that supports a WiFi communication function, a set top box that supports a WiFi communication function, a smart television that supports a WiFi communication function, a smart wearable device that supports a WiFi communication function, a vehicle-mounted communications device that supports a WiFi communication function, and a computer that supports a WiFi communication function. Optionally, the station may support the 802.11ax standard. Further optionally, the station supports various WLAN standards such as 802.11ac, 802.11n, 802.11g, 802.11b, and 802.11a.

It should be noted that, in a WLAN system of 802.11ax into which an OFDMA technology is introduced, an AP can perform uplink and downlink transmission with different STAs on different time-frequency resources. The AP may perform uplink and downlink transmission in different modes, such as an OFDMA single-user multiple-input multiple-output (SU-MIMO) mode or an OFDMA multi-user multiple-input multiple-output (MU-MIMO) mode.

FIG. 1 is an application scenario diagram according to an embodiment of the present invention. An access point 20 communicates with multiple stations (30-1, 30-2, 30-3, and 30-4). The AP 20 includes a host processor 15 coupled to a network interface 16. The network interface 16 includes a Media Access Control (MAC) unit 17 and a physical layer (PHY) unit 18. The physical layer (PHY) unit 18 includes multiple transceivers (transmitter/receiver, TX/RX) 19-1, 19-2, 19-3, and the transceivers 19-1, 19-2, 19-3 are coupled to multiple antenna pairs. Although three transceivers 19-1, 19-2, 19-3 and three antennas 14-1, 14-2, 14-3 are shown in FIG. 1, the AP 20 may include different quantities (such as 1, 2, 4, or 5) of transceivers and different quantities (such as 1, 2, 4, or 5) of antenna pairs in other implementation manners.

The station 30-1 includes a host processor 25 coupled to a network interface 26. The network interface 26 includes a MAC unit 27 and a PHY unit 28. The PHY unit 28 includes multiple transceivers 29-1, 29-2, 29-3, and the transceivers 29-1, 29-2, 29-3 are coupled to multiple antennas 24-1, 24-2, 24-3. Although three transceivers 29-1, 29-2, 29-3 and three antennas 24-1, 24-2, 24-3 are shown in FIG. 1, the client station 30-1 may include different quantities (such as 1, 2, 4, or 5) of transceivers and different quantities (such as 1, 2, 4, or 5) of antennas in other implementation manners. In this implementation manner, one or more of the stations 30-2, 30-3, and 30-4 have a structure that is the same as or similar to that of the client station 30-1, but may have a same quantity or different quantities of transceivers and antennas. For example, the conventional station 30-4 has only one transceiver and one antenna.

Figure 2:
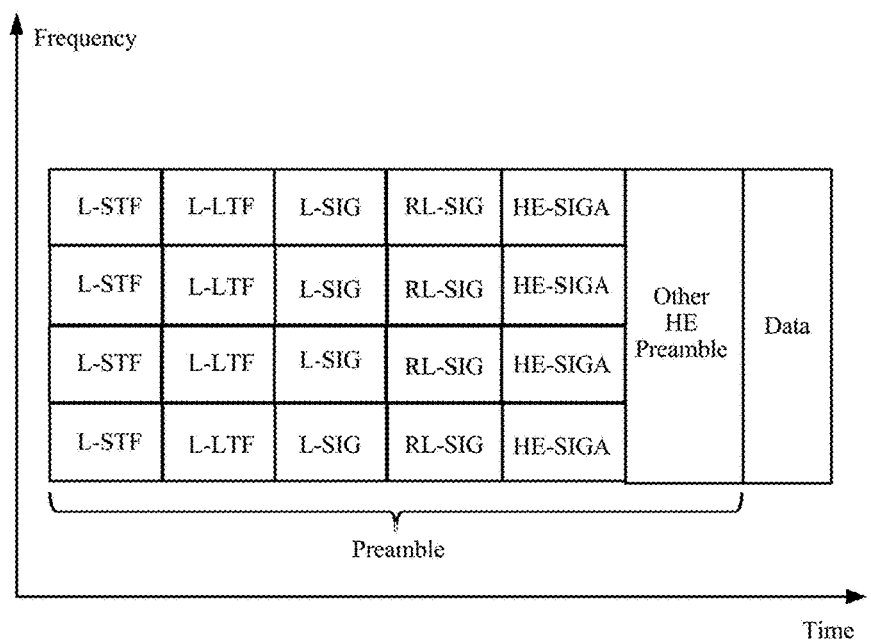
FIG. 2 is a structural diagram of a physical layer protocol data unit according to an embodiment of the present invention.

FIG. 2 is a structural diagram of a physical layer protocol data unit (PPDU) according to this implementation manner. The data unit occupies a bandwidth of 80 MHz. In other implementation manners, the data unit may occupy different bandwidths, for example a bandwidth of 20 MHz, 40 MHz, 120 MHz, 160 MHz, or any appropriate bandwidth. The data unit is suitable for a "hybrid mode" scenario. For example, when a WLAN 10 includes a station (for example, the conventional station 30-4), the station complies with a conventional protocol, but does not comply with an 802.11ax protocol. The data unit may also be used in another scenario.

It should be noted that the data unit in FIG. 2 is a possible 802.11ax data unit. To be compatible with an existing WLAN standard device, a header of 802.11ax data frame is a legacy preamble field that includes an L-STF (Legacy Short Training Field), an L-LTF (Legacy Long Training Field), and an L-SIG (Legacy Signaling Field). The legacy preamble field is followed by an RL-SIG (Repeated Legacy Signaling Field), a high efficiency signaling field A (HE-SIGA), and an other high efficiency preamble field (Other HE Preamble). It should be noted that the other HE preamble refers to one field or a combination of multiple fields, and is not limited to a specific field. The other HE preamble field is followed by a data field (Data). In a future possible WLAN standard, a name of the standard, a field name, or the like may be replaced by any other name, and this should not be construed as a limitation on the protection scope of the present invention. In addition, descriptions of the data frame are also applicable to subsequent embodiments.

Different from 802.11n and 802.11ac, an outdoor transmission scenario is considered in 802.11ax. A channel delay spread is large outdoors due to a relatively severe multipath effect, and therefore a relatively long CP (Cyclic Prefix) needs to be selected to ensure transmission quality.

Using a data part in a packet structure in FIG. 2 as an example, the data part includes multiple OFDM symbols. In 802.11ac, a length of an OFDM symbol is 4/3.6 μs, where a data length is 3.2 μs, and a CP length is 0.8/0.4 μs. For 802.11ax, to satisfy outdoor transmission performance, a CP length of 1.6/3.2 μs is required. If a data part is still 3.2 μs, a proportion that a CP accounts for in an OFDM symbol reaches 33% (1.6 μs CP+3.2 μs data) or 50% (3.2 μs CP+3.2 μs data). Therefore, to improve transmission efficiency, a 4× symbol length is introduced into 802.11ax, and correspondingly, an 802.11a/n/ac symbol is referred to as a 1× symbol.

The 4× symbol length means that a data length is 12.8 μs in an OFDM symbol. Correspondingly, a proportion that a CP of 3.2 μs accounts for in an OFDM symbol changes to (3.2/(3.2+12.8))=20%, so that transmission efficiency is effectively improved. It may be learned that a time domain transmission time of the data part changes from 3.2 μs to 12.8 μs and is increased by four times. Correspondingly, in a frequency domain, bandwidth of each subcarrier is decreased by four times because smaller bandwidth indicates a longer transmission time. Specifically, for 802.11ac, there are 64 subcarriers on 20 M, and the 64 subcarriers are corresponding to 64-point FFT; there are 128 subcarriers on 40 M, and the 128 subcarriers are corresponding to 128-point FFT; there are 256 subcarriers on 80 M, and the 256 subcarriers are corresponding to 256-point FFT. For 802.11ax, there are 256 subcarriers on 20 M, and the 256 subcarriers are corresponding to 256-point FFT; there are 512 subcarriers on 40 M, and the 512 subcarriers are corresponding to 512-point FFT; there are 1024 subcarriers on 80 M, and the 1024 subcarriers are corresponding to 1024-point FFT.

Using 20 M as an example, the 64 subcarriers in 802.11ac include 52 data subcarriers and four pilot subcarriers, and the 256 subcarriers in 802.11ax include 234 data subcarriers and eight pilot subcarriers. If a same MCS is used, a volume of data that can be transmitted in 802.11ax is greater than four times that can be transmitted in 802.11ac, because (234>4×52). It is the same for 40 M and 80 M.

As described in the Background, each OFDM symbol of a data part of 802.11ax includes a data volume that is greater than four times that included in each OFDM symbol of a data part of 802.11ac. Therefore, a time required for a receive end to process each OFDM symbol increases. A processing process at the receive end mainly includes: 1. FFT; 2. demapping; and 3. channel decoding. The most time consuming part is channel decoding. The time for channel decoding increases because the data volume in each OFDM symbol increases. This processing delay becomes very severe in a case of large bandwidth (80 M or the like), a high MSC (MSC9 or the like), and LDPC coding.

When receiving a data frame or a control frame that requires an immediate response (a response after a SIFS=16 μs), the receive end needs to first process the data frame or the control frame, and then switch from a receiving state to a sending state. The two parts need to be completed within a SIFS time. For a 1× symbol length (that is, an 802.11a/n/ac frame), SIFS duration of 16 μs is sufficient for the receive end to complete data processing and state switching. However, for a 4× symbol (that is, an 802.11ax frame), data processing may cause a relatively long delay, as described in the foregoing paragraph. Therefore, the SIFS duration of 16 μs may not be sufficient for the receive end to complete data processing and state switching in some cases.

Based on the above, implementation manners of the present invention focus on resolving a problem that SIFS duration may not be sufficient for a receive end to complete data processing and state switching. To make the implementation manners of the present invention clear, several possible implementation manners are described first, and then several examples of implementation manners are described with emphasis.

Possible Implementation Manner 1

Figure 3:
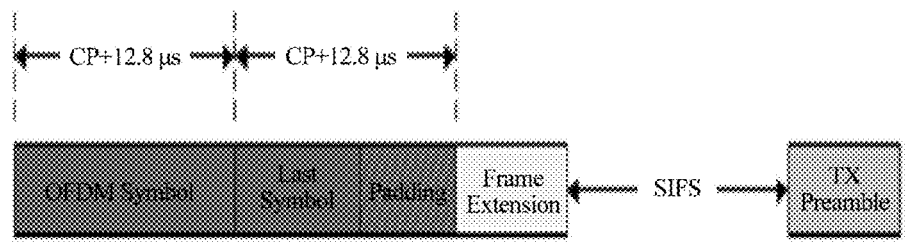
FIG. 3 is a partial structural diagram of a PPDU according to a possible embodiment.

As shown in FIG. 3, in the possible implementation manner 1, a frame extension (FE) field is added after the last OFDM symbol in current transmission, so as to provide a receive end with some extra time for processing received data. It may be further learned that a part of the last OFDM symbol is padding bits. The padding part is physical layer padding, that is, not involved in encoding or decoding. Therefore, the receive end may not decode this part, so that a time required for data processing is reduced. To enable the receive end to learn a position at which decoding needs to be stopped, in the possible implementation manner 1, a payload length of a user is further indicated in an HE-SIGB.

A length of the frame extension is a function of current transmission bandwidth, an MCS, a stream quantity, duration of the padding, and a processing capability of the receive end. A transmit end first calculates a processing time required by the receive end, according to the current transmission bandwidth, the MCS, the stream quantity, and the processing capability of the receive end, and the processing time is denoted as x μs. Then, the duration of the padding in the last OFDM symbol is calculated according to a data volume of the user, and is denoted as y μs. Finally, a value not less than x-y is selected from [0, 4, 8, 12, 16] μs as the length of the frame extension. A waveform of the frame extension is not limited. A start point of a SIFS is after the frame extension.

For a multi-user case (MU-MIMO, OFDMA), the transmit end calculates one frame extension for each user, selects a longest frame extension, places the longest frame extension after the last OFDM symbol, and adds a payload length indication to an HE-SIGB for each user.

However, the possible implementation manner 1 has the following disadvantage:

Because a relatively large quantity of bits are required to indicate a payload length of a user, and bits in an HE-SIG are precious, overheads in the possible implementation manner 1 are relatively large. Especially when there are multiple users, the overheads become larger because a payload length of each user needs to be indicated.

Possible Implementation Manner 2

Figure 4:
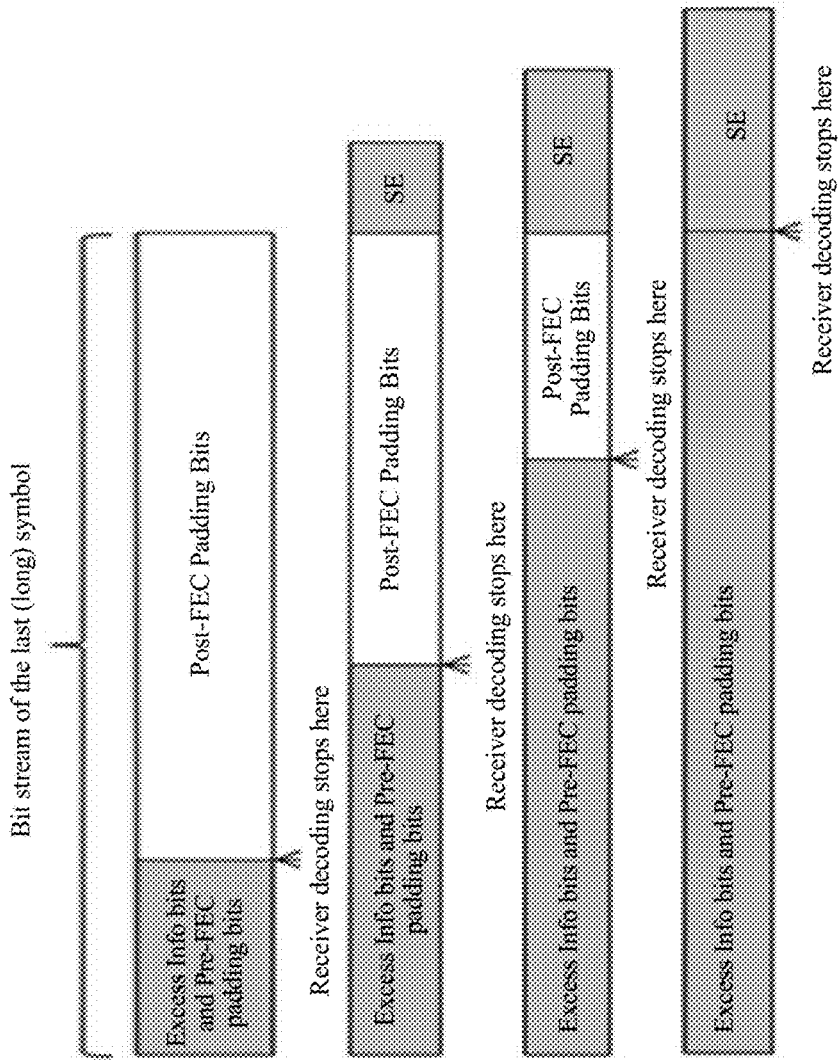
FIG. 4 is a partial structural diagram of a PPDU according to a possible embodiment.

The possible implementation manner 2 is essentially similar to the possible implementation manner 1. As shown in FIG. 4, in the possible implementation manner 2, a signal extension (SE, that is, the frame extension in the possible implementation manner 1) field is also added after the last OFDM symbol, so as to provide a receive end with some extra time for processing received data. It may be learned that the last OFDM symbol also includes some padding bits, that is, padding. The padding is referred to as post-FEC padding in the possible implementation manner 2, is essentially physical layer padding, and is not involved in encoding or decoding. In the possible implementation manner 2, pre-FEC padding is different from the post-FEC padding in that the pre-FEC padding is padding that needs to be involved in encoding and decoding and that needs to be processed by the receive end in a same manner as the receive end processes an information bit.

A function of the post-FEC padding is also to prevent the receive end from performing processing, so as to reduce a time required for data processing. Therefore, a transmit end also needs to inform the receive end of a position at which decoding needs to be stopped. Different from the possible implementation manner 1, in the possible implementation manner 2, the receive end is informed, not by indicating a payload length, of the position at which decoding needs to be stopped, but instead, the last OFDM symbol is divided into multiple segments, and a proportion that excess info bits and pre-FEC padding bits account for in the last OFDM symbol is indicated in an HE-SIG. For example, 00 indicates that the proportion is ¼, 01 indicates that the proportion is ½, 10 indicates that the proportion is ¾, and 11 indicates that the proportion is 1. After reading the indication, the receive end stops decoding at a corresponding segment.

There is a one-to-one mapping relationship between a length of the signal extension and the proportion that the excess info bit and pre-FEC padding bit account for, that is, a particular position at which decoding needs to be stopped is corresponding to a particular length of the signal extension. In this way, the length of the signal extension may also be obtained according to the foregoing indication.

The solution of the possible implementation manner 2 has the following disadvantage:

Indication overheads in the HE-SIG are still relatively large, and are at least two bits. In addition, the length of the signal extension does not vary with different transmission scenarios (for example, BW, an MCS, and a stream quantity), and this may cause overprotection. For example, if the proportion that the excess info bit and pre-FEC padding bit account for is ¾, it does not mean that the signal extension needs to be added, because a very low MCS or a very small stream quantity may be used in current transmission and a conventional SIFS time is sufficient for a receive end to complete data processing and state switching.

Possible Implementation Manner 3

Figure 5:
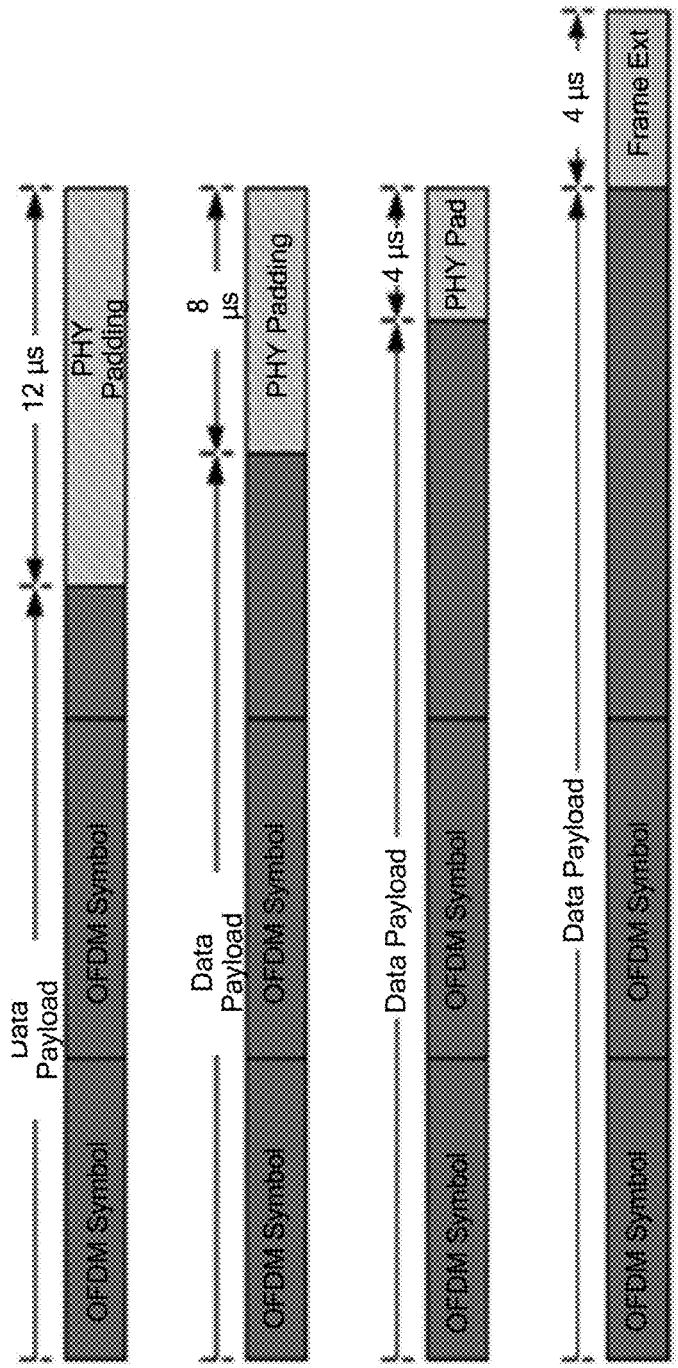
FIG. 5 is a partial structural diagram of a PPDU according to a possible embodiment.

As shown in FIG. 5, the possible implementation manner 3 is the same as the possible implementation manners 1 and 2 in that a frame extension (denoted as frame ext in FIG. 5) field is added after the last OFDM symbol, so as to provide a receive end with some extra time for processing received data. A difference lies in that, in the possible implementation manner 3, the frame extension is optional, and may be set to 0 if needed. In addition, as shown in FIG. 5, in the possible implementation manner 3, the last OFDM symbol also includes some padding bits, that is, padding. The padding is physical layer padding denoted as PHY Padding, and is not involved in encoding or decoding.

A function of the PHY padding is also to prevent the receive end from performing processing, so as to reduce a time required for data processing. Therefore, a transmit end also needs to inform the receive end of a position at which decoding needs to be stopped. Different from the possible implementation manners 1 and 2, in the possible implementation manner 3, two bits are used to indicate a length of the PHY Padding. For example, 00 indicates that there is no PHY padding, 01 indicates that the length of the PHY padding is ¼ a length of the last OFDM symbol, 10 indicates that the length of the PHY padding is ½ the length of the last OFDM symbol, and 11 indicates that the length of the PHY padding is ¾ the length of the last OFDM symbol. In addition, in the possible implementation manner 3, three bits are used to indicate the following lengths of the frame extension (that is, the Signal Extension in the possible implementation manner 2): {0, 4 μs, 8 μs, 12 μs, 16 μs}. Five bits are used to indicate the lengths of the PHY padding and the frame extension, so that the respective lengths of the PHY padding and the frame extension may be flexibly indicated in the possible implementation manner 3.

The possible implementation manner 3 has the following disadvantage:

Because the lengths of the PHY padding and the frame extension are indicated by using five bits, overheads are relatively large.

Possible Implementation Manner 4

The possible implementation manner 4 is similar to the possible implementation manner 2 in that two bits are used to indicate a position that is in a segment of the last OFDM symbol and at which decoding needs to be stopped. In addition, a signal extension field is added, so as to provide a receive end with some extra time for processing received data. A difference lies in that, in the possible implementation manner 4, the signal extension is optional, and may be set to 0 if needed. To avoid that one more symbol may be calculated when a quantity of 4× OFDM symbols is calculated, a single bit is used at a transmit end to avoid ambiguity caused by such a possibility.

The possible implementation manner 4 has the following disadvantage:

Processing at the transmit end is relatively complex. Not only a position at which decoding needs to be stopped needs to be marked, but also it needs to be determined, through calculation, whether an extra OFDM symbol may be decoded at the receive end within a current transmission time.

Several examples of implementation manners are provided below, and the examples of the implementation manners are better than the foregoing several possible implementation manners in one or more of the following aspects:

1. Indication bits in an HE-SIG are saved, and a receive end can also learn a position that is in the last OFDM symbol carrying useful data and at which decoding needs to be stopped.

2. When OFDM symbols of users are not aligned in multi-user transmission, the users can still learn respective decoding end positions.

3. When a payload length of a user is not indicated, and a length of a signal extension is a function of transmission bandwidth, an MCS, a stream quantity, and a processing capability of the receive end, the receive end can correctly locate a position of the last OFDM symbol that carries useful data.

Example of Implementation Manners

The last OFDM symbol of a PPDU may include a physical layer padding bit(PHY Padding). The last OFDM symbol is followed by a frame extension (FE or SE) field, so as to provide a receive end with some extra time for processing received data.

At a transmit end:

Step 101: Generate a PPDU, where the PPDU includes a signal extension SE field, the SE field is after the last orthogonal frequency division multiplexing OFDM symbol that carries useful information, the PPDU includes indication information, the indication information is in a high efficiency signaling field HE-SIG, and the indication information I is generated based on a symbol length of the SE field and is used to indicate whether a receive end needs to adjust a calculated quantity of OFDM symbols.

Step 102: Send the PPDU.

Optionally, whether the current PPDU includes the SE may be determined according to BW, an MCS, a stream quantity, a coding scheme indication, or the like in the current HE-SIG.

Specifically, the indication I may occupy one bit, and may also be referred to as an ambiguity indication I. How to efficiently set the ambiguity indication I is a focus of the following specific implementation manners.

Generally, the transmit end obtains the ambiguity indication I according to a quantity N of OFDM symbols actually included in the PPDU and a quantity M of OFDM symbols obtained by the receive end.

In a possible implementation manner, a value of the ambiguity indication I is determined by using the following formula:

when $$T_{SE}+\text{L-LENGTH Rounding Error}>(12,8+T_{GI})\text{us} \quad \text{(formula 1)}$$

is satisfied, the ambiguity indication I is a first value; or when the foregoing formula 1 is not satisfied, the ambiguity indication I is a second value, where the L-Length rounding error is a difference between actual transmission duration and transmission duration that is indicated by L-length.

In short, at the transmit end, when a difference is added to a length of the SE, the difference is a result (L-Length rounding error) of subtracting the actual transmission duration from the transmission duration that is calculated according to L-Length. When a result of the adding is greater than one 4× OFDM symbol, the ambiguity indication I is set to 1.

Figure 6:
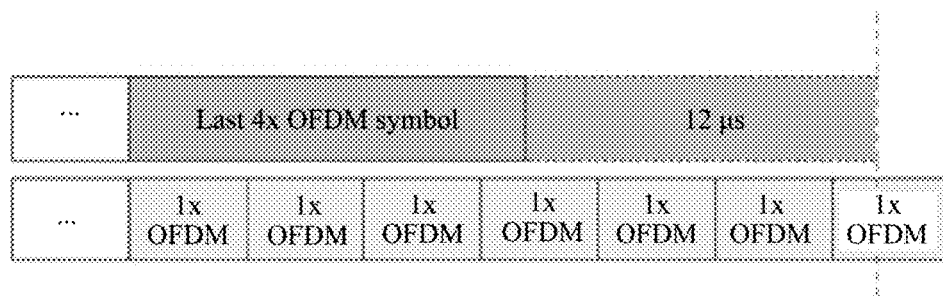
FIG. 6 is a simplified schematic diagram of an L-LENGTH Rounding Error in a PPDU according to an example of embodiments.

Specifically, in a general implementation manner, referring to FIG. 6, an entire PPDU that includes an SE is considered, and a difference between actual duration of the entire PPDU and transmission duration indicated by L-length is an L-Length rounding error.

Figure 7:
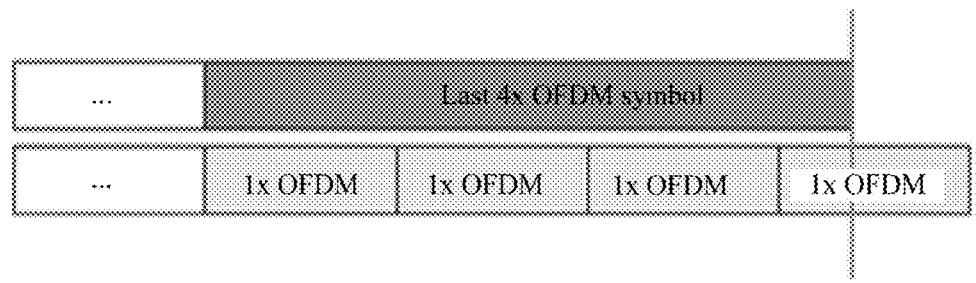
FIG. 7 is a simplified schematic diagram of an L-LENGTH Rounding Error in a PPDU according to an example of embodiments.

In an implementation process, when the length of the SE is a multiple of a 1× OFDM length (four microseconds), referring to FIG. 7, only a part that is of the PPDU and that does not include duration $T_{SE}$ of the SE may be considered, and a difference between actual duration of this part and transmission duration that does not include an L-length indication of the SE is denoted as an L-Length rounding error 1. In this case, the L-Length rounding error 1 is essentially the same as the L-Length rounding error, but a calculation process of the L-Length rounding error 1 is simpler.

Referring to the following Example 1, in the example, the L-LENGTH Rounding Error ($\Delta_{RE}$) is defined by using a formula.

Embodiment 1

When $T_{SE}$ is not considered, an L-LENGTH Rounding Error 1 may be calculated by using the following solution:

At a transmit end:

001. The transmit end learns an actual transmission time.

For example, the actual transmission time TXTIME is obtained according to formula 2.

$$\text{TXTIME}=T_{L\_PREAMBLE}+T_{HE\_PREAMBLE}+T_{HE\_DATA} \quad \text{formula 2}$$

where, $T_{HE\_DATA}=N\cdot(12.8+T_{GI})$, and N is a quantity of 4× OFDM symbols that actually need to be transmitted by the transmit end;

$T_{L\_PREAMBLE}$ refers to transmission duration of an L-preamble; and $T_{HE\_PREAMBLE}$ refers to transmission duration of an HE-preamble.

002. Obtain a value of L-LENGTH according to TXTIME.

$$\text{L\_LENGTH}=\left\lceil\frac{T_{L\_PREAMBLE}+T_{HE\_PREAMBLE}+T_{HE\_DATA}-20}{4}\right\rceil\times 3-3+m, \quad \text{formula 3}$$

$$m=1 \text{ or } 2$$

where m is a remainder of L-LENGTH modulo 3, and the value of L-LENGTH is included in a preamble of a PPDU.

003. Obtain, by using L-LENGTH, a transmission time TXTIME* corresponding to a 1× symbol:

$$\text{TXTIME}^*=\left\lceil\frac{\text{L\_LENGTH}-m+3}{3}\right\rceil\times 4+20 \quad \text{formula 4}$$

$$=\left\lceil\frac{T_{L\_PREAMBLE}+T_{HE\_PREAMBLE}+T_{HE\_DATA}-20}{4}\right\rceil\times 4+20$$

004. Obtain an L-LENGTH Rounding Error 1.

$$\Delta_{RE}=\text{TXTIME}^*-\text{TXTIME} \quad \text{formula 5}$$

$$=\left\lceil\frac{T_{L\_PREAMBLE}+T_{HE\_PREAMBLE}+T_{HE\_DATA}-20}{4}\right\rceil\times 4+20-$$

$$(T_{L\_PREAMBLE}+T_{HE\_PREAMBLE}+T_{HE\_DATA})$$

-continued $$= \left\lceil \frac{T_{L\_PREAMBLE} + T_{HE\_PREAMBLE} + T_{HE\_DATA} - 20}{4} \right\rceil \times 4 -$$

$$(T_{L\_PREAMBLE} + T_{HE\_PREAMBLE} + T_{HE\_DATA}) \quad 5$$

Alternatively, the foregoing step 001, 002, or 003 may be an optional step. That is, the L-LENGTH Rounding Error 1 may be obtained by using only formula 5 in step 004. Certainly, when there is no conflict, any combination of step 201, 202, or 203 may be included.

Embodiment 2

When $T_{SE}$ is considered, an L-LENGTH Rounding Error may be calculated by using the following solution:

201. A transmit end learns an actual transmission time TXTIME.

$$TXTIME = T_{L\_PREAMBLE} + T_{HE\_PREAMBLE} + T_{HE\_DATA} + T_{SE} \quad \text{formula 6}$$

where, $T_{HE\_DATA} = N \cdot (12.8 + T_{GI})$, and N is a quantity of 4× OFDM symbols that actually need to be transmitted by the transmit end;

$T_{L\_PREAMBLE}$ refers to transmission duration of an L-preamble; and $T_{HE\_PREAMBLE}$ refers to transmission duration of an HE-preamble.

202. A value of L-LENGTH obtained by using TXTIME is:

$$L\_LENGTH = \quad \text{formula 7}$$

$$\left\lceil \frac{T_{L\_PREAMBLE} + T_{HE\_PREAMBLE} + T_{HE\_DATA} + T_{SE} - 20}{4} \right\rceil \times 3 -$$

$$3 + m, m = 1 \text{ or } 2$$

where m is a remainder of L-LENGTH modulo 3.

203. A transmission time that is corresponding to a 1× symbol and calculated by using L-LENGTH is:

$$TXTIME^* = \left\lceil \frac{L\_LENGTH - m + 3}{3} \right\rceil \times 4 + 20 \quad \text{formula 8}$$

$$= \left\lceil \frac{T_{L\_PREAMBLE} + T_{HE\_PREAMBLE} + T_{HE\_DATA} - 20}{4} \right\rceil \times 4 + 20$$

204. Obtain an L-LENGTH Rounding Error ($\Delta_{RE}$).

$$\Delta_{RE} = TXTIME^* - TXTIME \quad \text{formula 9}$$

$$= \left\lceil \frac{T_{L\_PREAMBLE} + T_{HE\_PREAMBLE} + T_{HE\_DATA} + T_{SE} - 20}{4} \right\rceil \times 4 + 20 -$$

$$(T_{L\_PREAMBLE} + T_{HE\_PREAMBLE} + T_{HE\_DATA} + T_{SE})$$

$$= \left\lceil \frac{T_{L\_PREAMBLE} + T_{HE\_PREAMBLE} + T_{HE\_DATA} - T_{SE}}{4} \right\rceil \times 4 -$$

$$(T_{L\_PREAMBLE} + T_{HE\_PREAMBLE} + T_{HE\_DATA} + T_{SE})$$

Alternatively, the foregoing step 201, 202, or 203 may be an optional step. That is, the L-LENGTH Rounding Error may be obtained by using only formula 9 in step 204. Certainly, when there is no conflict, any combination of step 201, 202, or 203 may be included.

Preferably, to reduce calculation complexity, the L-LENGTH Rounding Error may be calculated not by simply using the formulas, but instead, the L-LENGTH Rounding Error ($\Delta_{RE}$) is obtained according to a stored table.

Embodiment 3

When $T_{4\times OFDM} = 12.8 + 0.8$ (0.8 is a cyclic prefix CP length), that is, when a length of a 4× OFDM symbol is 12.8+0.8, the following Table 1 is stored.

|  | 5n + 0 | 5n + 1 | 5n + 2 | 5n + 3 | 5n + 4 |
|---|---|---|---|---|---|
| $\Delta_{p\_RE} = 0$ μs | $\Delta_{RE} = 0$ μs | $\Delta_{RE} = 2.4$ μs | $\Delta_{RE} = 0.8$ μs | $\Delta_{RE} = 3.2$ μs | $\Delta_{RE} = 1.6$ μs |
| $\Delta_{p\_RE} = 0.8$ μs | $\Delta_{RE} = 0.8$ μs | $\Delta_{RE} = 3.2$ μs | $\Delta_{RE} = 1.6$ μs | $\Delta_{RE} = 0$ μs | $\Delta_{RE} = 2.4$ μs |
| $\Delta_{p\_RE} = 1.6$ μs | $\Delta_{RE} = 1.6$ μs | $\Delta_{RE} = 0$ μs | $\Delta_{RE} = 2.4$ μs | $\Delta_{RE} = 0.8$ μs | $\Delta_{RE} = 3.2$ μs |
| $\Delta_{p\_RE} = 2.4$ μs | $\Delta_{RE} = 2.4$ μs | $\Delta_{RE} = 0.8$ μs | $\Delta_{RE} = 3.2$ μs | $\Delta_{RE} = 1.6$ μs | $\Delta_{RE} = 0$ μs |
| $\Delta_{p\_RE} = 3.2$ μs | $\Delta_{RE} = 3.2$ μs | $\Delta_{RE} = 1.6$ μs | $\Delta_{RE} = 0$ μs | $\Delta_{RE} = 2.4$ μs | $\Delta_{RE} = 0.8$ μs |

In Table 1, a row parameter $\Delta_{p\_RE}$ is a part in which a preamble included in a PPDU cannot be aligned with a 1× OFDM symbol, and a column parameter is a quantity of 4× OFDM symbols included in the PPDU, for example, 5n+0, 5n+1, . . . , or 5n+4, where n is a nonnegative integer.

Further, $\Delta_{p\_RE}$ may be calculated in but is not limited to the following manner:

$$\Delta_{p\_RE} = \left\lceil \frac{T_{L\_PREAMBLE} + T_{HE\_PREAMBLE} - 20}{4} \right\rceil \times \quad \text{formula 10}$$

$$4 + 20 - (T_{L\_PREAMBLE} + T_{HE\_PREAMBLE})$$

$$= \left\lceil \frac{T_{L\_PREAMBLE} + T_{HE\_PREAMBLE}}{4} \right\rceil \times$$

$$4 - (T_{L\_PREAMBLE} + T_{HE\_PREAMBLE})$$

When $T_{4\times OFM} = 12.8 + 1.6$ (1.6 is a cp length), that is, when a length of a 4× OFDM symbol is 12.8+0.8, the following Table 2 is stored.

|  | 5n + 0 | 5n + 1 | 5n + 2 | 5n + 3 | 5n + 4 |
|---|---|---|---|---|---|
| $\Delta_{p\_RE} = 0$ µs | $\Delta_{RE} = 0$ µs | $\Delta_{RE} = 1.6$ µs | $\Delta_{RE} = 3.2$ µs | $\Delta_{RE} = 0.8$ µs | $\Delta_{RE} = 2.4$ µs |
| $\Delta_{p\_RE} = 0.8$ µs | $\Delta_{RE} = 0.8$ µs | $\Delta_{RE} = 2.4$ µs | $\Delta_{RE} = 0$ µs | $\Delta_{RE} = 1.6$ µs | $\Delta_{RE} = 3.2$ µs |
| $\Delta_{p\_RE} = 1.6$ µs | $\Delta_{RE} = 1.6$ µs | $\Delta_{RE} = 3.2$ µs | $\Delta_{RE} = 0.8$ µs | $\Delta_{RE} = 2.4$ µs | $\Delta_{RE} = 0$ µs |
| $\Delta_{p\_RE} = 2.4$ µs | $\Delta_{RE} = 2.4$ µs | $\Delta_{RE} = 0$ µs | $\Delta_{RE} = 1.6$ µs | $\Delta_{RE} = 3.2$ µs | $\Delta_{RE} = 0.8$ µs |
| $\Delta_{p\_RE} = 3.2$ µs | $\Delta_{RE} = 3.2$ µs | $\Delta_{RE} = 0.8$ µs | $\Delta_{RE} = 2.4$ µs | $\Delta_{RE} = 0$ µs | $\Delta_{RE} = 1.6$ µs |

In Table 2, a row parameter $\Delta_{p\_RE}$ is a part in which a preamble included in a PPDU cannot be aligned with a 1× OFDM symbol, and a column parameter is a quantity of 4× OFDM symbols included in the PPDU, for example, 5n+0, 5n+1, . . . , or 5n+4, where n is a nonnegative integer.

Further, $\Delta_{p\_RE}$ may be calculated by using, but is not limited to, the foregoing formula 10.

When $T_{4\times OFDM}=12.8+3.2$ (3.2 is a cp length), Table 3 may be stored.

|  | 5n + 0 | 5n + 1 | 5n + 2 | 5n + 3 | 5n + 4 |
|---|---|---|---|---|---|
| $\Delta_{p\_RE} = 0$ µs | $\Delta_{RE} = 0$ µs | $\Delta_{RE} = 0$ µs | $\Delta_{RE} = 0$ µs | $\Delta_{RE} = 0$ µs | $\Delta_{RE} = 0$ µs |
| $\Delta_{p\_RE} = 0.8$ µs | $\Delta_{RE} = 0.8$ µs | $\Delta_{RE} = 0.8$ µs | $\Delta_{RE} = 0.8$ µs | $\Delta_{RE} = 0.8$ µs | $\Delta_{RE} = 0.8$ µs |
| $\Delta_{p\_RE} = 1.6$ µs | $\Delta_{RE} = 1.6$ µs | $\Delta_{RE} = 1.6$ µs | $\Delta_{RE} = 1.6$ µs | $\Delta_{RE} = 1.6$ µs | $\Delta_{RE} = 1.6$ µs |
| $\Delta_{p\_RE} = 2.4$ µs | $\Delta_{RE} = 2.4$ µs | $\Delta_{RE} = 2.4$ µs | $\Delta_{RE} = 2.4$ µs | $\Delta_{RE} = 2.4$ µs | $\Delta_{RE} = 2.4$ µs |
| $\Delta_{p\_RE} = 3.2$ µs | $\Delta_{RE} = 3.2$ µs | $\Delta_{RE} = 3.2$ µs | $\Delta_{RE} = 3.2$ µs | $\Delta_{RE} = 3.2$ µs | $\Delta_{RE} = 3.2$ µs |

In Table 3, a row parameter $\Delta_{p\_RE}$ is a part in which a preamble included in a PPDU cannot be aligned with a 1× OFDM symbol, and a column parameter is a quantity of 4× OFDM symbols included in the PPDU, for example, 5n+0, 5n+1, . . . , or 5n+4, where n is a nonnegative integer.

Further, $\Delta_{p\_RE}$ may be calculated by using, but is not limited to, the foregoing formula 10.

Embodiment 4

When $T_{4\times OFDM}=12.8+0.8$ (0.8 is a cp length), the following Table 4 is stored.

|  | 5n + 0 | 5n + 1 | 5n + 2 | 5n + 3 | 5n + 4 |
|---|---|---|---|---|---|
| $\Delta_{p\_RE} = 0$ µs | $\Delta_{RE} = 0$ µs | $\Delta_{RE} = 2.4$ µs | $\Delta_{RE} = 0.8$ µs | $\Delta_{RE} = 3.2$ µs | $\Delta_{RE} = 1.6$ µs |
| $\Delta_{p\_RE} = 0.8$ µs | $\Delta_{RE} = 3.2$ µs | $\Delta_{RE} = 1.6$ µs | $\Delta_{RE} = 0$ µs | $\Delta_{RE} = 2.4$ µs | $\Delta_{RE} = 0.8$ µs |
| $\Delta_{p\_RE} = 1.6$ µs | $\Delta_{RE} = 2.4$ µs | $\Delta_{RE} = 0.8$ µs | $\Delta_{RE} = 3.2$ µs | $\Delta_{RE} = 2.4$ µs | $\Delta_{RE} = 0$ µs |
| $\Delta_{p\_RE} = 2.4$ µs | $\Delta_{RE} = 1.6$ µs | $\Delta_{RE} = 0$ µs | $\Delta_{RE} = 2.4$ µs | $\Delta_{RE} = 0.8$ µs | $\Delta_{RE} = 3.2$ µs |
| $\Delta_{p\_RE} = 3.2$ µs | $\Delta_{RE} = 0.8$ µs | $\Delta_{RE} = 3.2$ µs | $\Delta_{RE} = 1.6$ µs | $\Delta_{RE} = 0$ µs | $\Delta_{RE} = 2.4$ µs |

In Table 4, a row parameter $\Delta_{p\_RE}$ is a part in which a preamble included in a PPDU cannot be aligned with a 1× OFDM symbol, and a column parameter is a quantity of 4× OFDM symbols included in the PPDU, for example, 5n+0, 5n+1, . . . , or 5n+4, where n is a nonnegative integer.

Further, different from that in the foregoing embodiments, $\Delta_{p\_RE}$ is calculated in but is not limited to the following manner:

$$\Delta_{p\_RE} = (T_{L\_PREAMBLE} + T_{HE\_PREAMBLE}) - \left\lfloor \frac{T_{L\_PREAMBLE} + T_{HE\_PREAMBLE} - 20}{4} \right\rfloor \times 4 + 20$$
$$= (T_{L\_PREAMBLE} + T_{HE\_PREAMBLE}) - \left\lfloor \frac{T_{L\_PREAMBLE} + T_{HE\_PREAMBLE}}{4} \right\rfloor \times 4$$

formula 11

When $T_{4\times OFDM}=12.8+1.6$ (1.6 is a cp length), the following Table 5 is stored.

|  | 5n + 0 | 5n + 1 | 5n + 2 | 5n + 3 | 5n + 4 |
|---|---|---|---|---|---|
| $\Delta_{p\_RE} = 0$ µs | $\Delta_{RE} = 0$ µs | $\Delta_{RE} = 1.6$ µs | $\Delta_{RE} = 3.2$ µs | $\Delta_{RE} = 0.8$ µs | $\Delta_{RE} = 2.4$ µs |
| $\Delta_{p\_RE} = 0.8$ µs | $\Delta_{RE} = 3.2$ µs | $\Delta_{RE} = 0.8$ µs | $\Delta_{RE} = 2.4$ µs | $\Delta_{RE} = 0$ µs | $\Delta_{RE} = 1.6$ µs |
| $\Delta_{p\_RE} = 1.6$ µs | $\Delta_{RE} = 2.4$ µs | $\Delta_{RE} = 0$ µs | $\Delta_{RE} = 1.6$ µs | $\Delta_{RE} = 3.2$ µs | $\Delta_{RE} = 0.8$ µs |
| $\Delta_{p\_RE} = 2.4$ µs | $\Delta_{RE} = 1.6$ µs | $\Delta_{RE} = 3.2$ µs | $\Delta_{RE} = 0.8$ µs | $\Delta_{RE} = 2.4$ µs | $\Delta_{RE} = 0$ µs |
| $\Delta_{p\_RE} = 3.2$ µs | $\Delta_{RE} = 0.8$ µs | $\Delta_{RE} = 2.4$ µs | $\Delta_{RE} = 0$ µs | $\Delta_{RE} = 1.6$ µs | $\Delta_{RE} = 3.2$ µs |

In Table 5, a row parameter $\Delta_{p\_RE}$ is a part in which a preamble included in a PPDU cannot be aligned with a 1× OFDM symbol, and a column parameter is a quantity of 4× OFDM symbols included in the PPDU, for example, 5n+0, 5n+1, . . . , or 5n+4, where n is a nonnegative integer.

Further, $\Delta_{p\_RE}$ is calculated by using the foregoing formula 11.

When $T_{4\times OFDM}$=12.8+3.2 (3.2 is a cp length), the following Table 6 is stored.

| 5n + 0 | 5n + 1 | 5n + 2 | 5n + 3 | 5n + 4 | |
|---|---|---|---|---|---|
| $\Delta_{p\_RE}$ = 0 μs | $\Delta_{RE}$ = 0 μs | $\Delta_{RE}$ = 0 μs | $\Delta_{RE}$ = 0 μs | $\Delta_{RE}$ = 0 μs | $\Delta_{RE}$ = 0 μs |
| $\Delta_{p\_RE}$ = 0.8 μs | $\Delta_{RE}$ = 3.2 μs | $\Delta_{RE}$ = 3.2 μs | $\Delta_{RE}$ = 3.2 μs | $\Delta_{RE}$ = 3.2 μs | $\Delta_{RE}$ = 3.2 μs |
| $\Delta_{p\_RE}$ = 1.6 μs | $\Delta_{RE}$ = 2.4 μs | $\Delta_{RE}$ = 2.4 μs | $\Delta_{RE}$ = 2.4 μs | $\Delta_{RE}$ = 2.4 μs | $\Delta_{RE}$ = 2.4 μs |
| $\Delta_{p\_RE}$ = 2.4 μs | $\Delta_{RE}$ = 1.6 μs | $\Delta_{RE}$ = 1.6 μs | $\Delta_{RE}$ = 1.6 μs | $\Delta_{RE}$ = 1.6 μs | $\Delta_{RE}$ = 1.6 μs |
| $\Delta_{p\_RE}$ = 3.2 μs | $\Delta_{RE}$ = 0.8 μs | $\Delta_{RE}$ = 0.8 μs | $\Delta_{RE}$ = 0.8 μs | $\Delta_{RE}$ = 0.8 μs | $\Delta_{RE}$ = 0.8 μs |

In Table 6, a row parameter $\Delta_{p\_RE}$ is a part in which a preamble included in a PPDU cannot be aligned with a 1× OFDM symbol, and a column parameter is a quantity of 4× OFDM symbols included in the PPDU, for example, 5n+0, 5n+1, . . . , or 5n+4, where n is a nonnegative integer.

Further, $\Delta_{p\_RE}$ is calculated by using the foregoing formula 11.

Embodiment 5

Preferably, a Rounding Error is obtained according to Table 7, where HE-SIGB CP is a CP length of an HE-SIGB included in a PPDU (the HE-SIGB may include a public part and a private part; if a CP of the public part is the same as a CP of the private part, HE-SIGB CP is the same CP, or if a CP of the public part is different from a CP of the private part, HE-SIGB CP is the CP of the private part), HE-LTF is a length of an HE-LTF part included in the PPDU; 4× OFDM CP is a CP length of a 4× OFDM symbol of a data part included in the PPDU; $N_{SIGB}$ is a quantity of symbols that are in an HE-SIGB included in the PPDU and that are different from a symbol in an HE-SIGA in terms of length; $N_{LTF}$ is a quantity of LTFs included in the PPDU; $N_{DATA}$ is a quantity of 4× OFDM symbols included in the PPDU, for example, 5n+0, 5n+1, . . . , or 5n+4, where n is a nonnegative integer.

Optionally, an HE Rounding Error may be included. Preferably, the HE Rounding Error does not need to be included.

TABLE 7

| HE-SIGB CP | HE-LTF | 4x OFDM CP | $N_{SIGB}$ | $N_{LTF}$ | $N_{DATA}$ | Round Error $\Delta_{RE}$ | HE Round Error (optional) |
|---|---|---|---|---|---|---|---|
| 0.8 | 12.8 + 0.8 | 0.8 | ⌈ | 1 | 5n | 2.4 | 2.4 |
| 0.8 | 12.8 + 0.8 | 0.8 | ⌈ | 1 | 5n + 1 | 0.8 | 2.4 |
| 0.8 | 12.8 + 0.8 | 0.8 | ⌈ | 1 | 5n + 2 | 3.2 | 2.4 |
| 0.8 | 12.8 + 0.8 | 0.8 | ⌊ | 1 | 5n + 3 | 1.6 | 2.4 |
| 0.8 | 12.8 + 0.8 | 0.8 | ⌈ | 1 | 5n + 4 | 0 | 2.4 |
| 0.8 | 12.8 + 0.8 | 0.8 | ⌈ | 2 | 5n | 0.8 | 0.8 |
| 0.8 | 12.8 + 0.8 | 0.8 | ⌈ | 2 | 5n + 1 | 3.2 | 0.8 |
| 0.8 | 12.8 + 0.8 | 0.8 | ⌊ | 2 | 5n + 2 | 1.6 | 0.8 |
| 0.8 | 12.8 + 0.8 | 0.8 | ⌈ | 2 | 5n + 3 | 0 | 0.8 |
| 0.8 | 12.8 + 0.8 | 0.8 | ⌈ | 2 | 5n + 4 | 2.4 | 0.8 |
| 0.8 | 12.8 + 0.8 | 0.8 | ⌈ | 4 | 5n | 1.6 | 1.6 |
| 0.8 | 12.8 + 0.8 | 0.8 | ⌊ | 4 | 5n + 1 | 0 | 1.6 |
| 0.8 | 12.8 + 0.8 | 0.8 | ⌈ | 4 | 5n + 2 | 2.4 | 1.6 |
| 0.8 | 12.8 + 0.8 | 0.8 | ⌈ | 4 | 5n + 3 | 0.8 | 1.6 |
| 0.8 | 12.8 + 0.8 | 0.8 | ⌈ | 4 | 5n + 4 | 3.2 | 1.6 |
| 0.8 | 12.8 + 0.8 | 0.8 | ⌊ | 6 | 5n | 2.4 | 2.4 |
| 0.8 | 12.8 + 0.8 | 0.8 | ⌈ | 6 | 5n + 1 | 0.8 | 2.4 |
| 0.8 | 12.8 + 0.8 | 0.8 | ⌈ | 6 | 5n + 2 | 3.2 | 2.4 |
| 0.8 | 12.8 + 0.8 | 0.8 | ⌈ | 6 | 5n + 3 | 1.6 | 2.4 |
| 0.8 | 12.8 + 0.8 | 0.8 | ⌊ | 6 | 5n + 4 | 0 | 2.4 |
| 0.8 | 12.8 + 0.8 | 0.8 | ⌈ | 8 | 5n | 3.2 | 3.2 |
| 0.8 | 12.8 + 0.8 | 0.8 | ⌈ | 8 | 5n + 1 | 1.6 | 3.2 |
| 0.8 | 12.8 + 0.8 | 0.8 | ⌈ | 8 | 5n + 2 | 0 | 3.2 |
| 0.8 | 12.8 + 0.8 | 0.8 | ⌊ | 8 | 5n + 3 | 2.4 | 3.2 |
| 0.8 | 12.8 + 0.8 | 0.8 | ⌈ | 8 | 5n + 4 | 0.8 | 3.2 |
| 0.8 | 6.4 + 0.8 | 0.8 | ⌈ | 1 | 5n | 0.8 | 0.8 |
| 0.8 | 6.4 + 0.8 | 0.8 | ⌈ | 1 | 5n + 1 | 3.2 | 0.8 |
| 0.8 | 6.4 + 0.8 | 0.8 | ⌊ | 1 | 5n + 2 | 1.6 | 0.8 |
| 0.8 | 6.4 + 0.8 | 0.8 | ⌈ | 1 | 5n + 3 | 0 | 0.8 |
| 0.8 | 6.4 + 0.8 | 0.8 | ⌈ | 1 | 5n + 4 | 2.4 | 0.8 |
| 0.8 | 6.4 + 0.8 | 0.8 | ⌈ | 2 | 5n | 1.6 | 1.6 |
| 0.8 | 6.4 + 0.8 | 0.8 | ⌊ | 2 | 5n + 1 | 0 | 1.6 |
| 0.8 | 6.4 + 0.8 | 0.8 | ⌈ | 2 | 5n + 2 | 2.4 | 1.6 |
| 0.8 | 6.4 + 0.8 | 0.8 | ⌈ | 2 | 5n + 3 | 0.8 | 1.6 |
| 0.8 | 6.4 + 0.8 | 0.8 | ⌈ | 2 | 5n + 4 | 3.2 | 1.6 |
| 0.8 | 6.4 + 0.8 | 0.8 | ⌊ | 4 | 5n | 3.2 | 3.2 |
| 0.8 | 6.4 + 0.8 | 0.8 | ⌈ | 4 | 5n + 1 | 1.6 | 3.2 |
| 0.8 | 6.4 + 0.8 | 0.8 | ⌈ | 4 | 5n + 2 | 0 | 3.2 |
| 0.8 | 6.4 + 0.8 | 0.8 | ⌊ | 4 | 5n + 3 | 2.4 | 3.2 |
| 0.8 | 6.4 + 0.8 | 0.8 | ⌈ | 4 | 5n + 4 | 0.8 | 3.2 |
| 0.8 | 6.4 + 0.8 | 0.8 | ⌈ | 6 | 5n | 0.8 | 0.8 |
| 0.8 | 6.4 + 0.8 | 0.8 | ⌈ | 6 | 5n + 1 | 3.2 | 0.8 |
| 0.8 | 6.4 + 0.8 | 0.8 | ⌊ | 6 | 5n + 2 | 1.6 | 0.8 |
| 0.8 | 6.4 + 0.8 | 0.8 | ⌈ | 6 | 5n + 3 | 0 | 0.8 |
| 0.8 | 6.4 + 0.8 | 0.8 | ⌈ | 6 | 5n + 4 | 2.4 | 0.8 |
| 0.8 | 6.4 + 0.8 | 0.8 | ⌈ | 8 | 5n | 2.4 | 2.4 |
| 0.8 | 6.4 + 0.8 | 0.8 | ⌊ | 8 | 5n + 1 | 0.8 | 2.4 |
| 0.8 | 6.4 + 0.8 | 0.8 | ⌈ | 8 | 5n + 2 | 3.2 | 2.4 |
| 0.8 | 6.4 + 0.8 | 0.8 | ⌈ | 8 | 5n + 3 | 1.6 | 2.4 |
| 0.8 | 6.4 + 0.8 | 0.8 | ⌈ | 8 | 5n + 4 | 0 | 2.4 |
| 0.8 | 12.8 + 3.2 | 3.2 | ⌊ | 1 | 5n | 0 | 0 |
| 0.8 | 12.8 + 3.2 | 3.2 | ⌈ | 2 | 5n + 1 | 0 | 0 |
| 0.8 | 12.8 + 3.2 | 3.2 | ⌈ | 4 | 5n + 2 | 0 | 0 |
| 0.8 | 12.8 + 3.2 | 3.2 | ⌊ | 6 | 5n + 3 | 0 | 0 |
| 0.8 | 12.8 + 3.2 | 3.2 | ⌈ | 8 | 5n + 4 | 0 | 0 |
| 0.8 | 6.4 + 3.2 | 3.2 | ⌈ | 1 | 5n | 2.4 | 2.4 |
| 0.8 | 6.4 + 3.2 | 3.2 | ⌊ | 2 | 5n + 1 | 0.8 | 0.8 |
| 0.8 | 6.4 + 3.2 | 3.2 | ⌈ | 4 | 5n + 2 | 1.6 | 1.6 |
| 0.8 | 6.4 + 3.2 | 3.2 | ⌈ | 6 | 5n + 3 | 2.4 | 2.4 |
| 0.8 | 6.4 + 3.2 | 3.2 | ⌊ | 8 | 5n + 4 | 3.2 | 3.2 |
| 3.2 | 12.8 + 3.2 | 3.2 | 1 | ⌈ | ⌈ | 1.6 | 1.6 |
| 3.2 | 12.8 + 3.2 | 3.2 | 2 | ⌈ | ⌈ | 3.2 | 3.2 |
| 3.2 | 12.8 + 3.2 | 3.2 | 3 | ⌊ | ⌊ | 0.8 | 0.8 |
| 3.2 | 12.8 + 3.2 | 3.2 | 4 | ⌈ | ⌈ | 2.4 | 2.4 |

TABLE 7-continued

| HE-SIGB CP | HE-LTF | 4x OFDM CP | $N_{SIGB}$ | $N_{LTF}$ | $N_{DATA}$ | Round Error $\Delta_{RE}$ | HE Round Error (optional) |
|---|---|---|---|---|---|---|---|
| 3.2 | 12.8 + 3.2 | 3.2 | 5 | ⌈ | ⌈ | 0 | 0 |
| 3.2 | 12.8 + 3.2 | 3.2 | 6 | ⌈ | ⌈ | 1.6 | 1.6 |
| 3.2 | 12.8 + 3.2 | 3.2 | 7 | ⌈ | ⌈ | 3.2 | 3.2 |
| 3.2 | 12.8 + 3.2 | 3.2 | 8 | L | L | 0.8 | 0.8 |
| 3.2 | 12.8 + 3.2 | 3.2 | 9 | ⌈ | ⌈ | 2.4 | 2.4 |
| 3.2 | 12.8 + 3.2 | 3.2 | 10 | Γ | Γ | 0 | 0 |
| 3.2 | 12.8 + 3.2 | 3.2 | 11 | ⌈ | ⌈ | 1.6 | 1.6 |
| 3.2 | 12.8 + 3.2 | 3.2 | 12 | L | L | 3.2 | 3.2 |
| 3.2 | 12.8 + 3.2 | 3.2 | 13 | ⌈ | ⌈ | 0.8 | 0.8 |
| 3.2 | 12.8 + 3.2 | 3.2 | 14 | Γ | Γ | 2.4 | 2.4 |
| 3.2 | 12.8 + 3.2 | 3.2 | 15 | ⌈ | ⌈ | 0 | 0 |
| 3.2 | 12.8 + 3.2 | 3.2 | 16 | L | L | 1.6 | 1.6 |
| 3.2 | 6.4 + 3.2 | 3.2 | 1 | 1 | ⌈ | 0 | 0 |
| 3.2 | 6.4 + 3.2 | 3.2 | 1 | 2 | Γ | 2.4 | 2.4 |
| 3.2 | 6.4 + 3.2 | 3.2 | 1 | 4 | L | 3.2 | 3.2 |
| 3.2 | 6.4 + 3.2 | 3.2 | 1 | 6 | L | 0 | 0 |
| 3.2 | 6.4 + 3.2 | 3.2 | 1 | 8 | ⌈ | 0.8 | 0.8 |
| 3.2 | 6.4 + 3.2 | 3.2 | 2 | 1 | Γ | 1.6 | 1.6 |
| 3.2 | 6.4 + 3.2 | 3.2 | 2 | 2 | L | 0 | 0 |
| 3.2 | 6.4 + 3.2 | 3.2 | 2 | 4 | ⌈ | 0.8 | 0.8 |
| 3.2 | 6.4 + 3.2 | 3.2 | 2 | 6 | Γ | 1.6 | 1.6 |
| 3.2 | 6.4 + 3.2 | 3.2 | 2 | 8 | Γ | 2.4 | 2.4 |
| 3.2 | 6.4 + 3.2 | 3.2 | 3 | 1 | L | 3.2 | 3.2 |
| 3.2 | 6.4 + 3.2 | 3.2 | 3 | 2 | ⌈ | 1.6 | 1.6 |
| 3.2 | 6.4 + 3.2 | 3.2 | 3 | 4 | Γ | 2.4 | 2.4 |
| 3.2 | 6.4 + 3.2 | 3.2 | 3 | 6 | ⌈ | 3.2 | 3.2 |
| 3.2 | 6.4 + 3.2 | 3.2 | 3 | 8 | L | 0 | 0 |
| 3.2 | 6.4 + 3.2 | 3.2 | 4 | 1 | ⌈ | 0.8 | 0.8 |
| 3.2 | 6.4 + 3.2 | 3.2 | 4 | 2 | Γ | 3.2 | 3.2 |
| 3.2 | 6.4 + 3.2 | 3.2 | 4 | 4 | ⌈ | 0 | 0 |
| 3.2 | 6.4 + 3.2 | 3.2 | 4 | 6 | L | 0.8 | 0.8 |
| 3.2 | 6.4 + 3.2 | 3.2 | 4 | 8 | ⌈ | 1.6 | 1.6 |
| 3.2 | 6.4 + 3.2 | 3.2 | 5 | 1 | Γ | 2.4 | 2.4 |
| 3.2 | 6.4 + 3.2 | 3.2 | 5 | 2 | ⌈ | 0.8 | 0.8 |
| 3.2 | 6.4 + 3.2 | 3.2 | 5 | 4 | L | 1.6 | 1.6 |
| 3.2 | 6.4 + 3.2 | 3.2 | 5 | 6 | ⌈ | 2.4 | 2.4 |
| 3.2 | 6.4 + 3.2 | 3.2 | 5 | 8 | Γ | 3.2 | 3.2 |
| 3.2 | 6.4 + 3.2 | 3.2 | 6 | 1 | ⌈ | 0 | 0 |
| 3.2 | 6.4 + 3.2 | 3.2 | 6 | 2 | L | 2.4 | 2.4 |
| 3.2 | 6.4 + 3.2 | 3.2 | 6 | 4 | ⌈ | 3.2 | 3.2 |
| 3.2 | 6.4 + 3.2 | 3.2 | 6 | 6 | Γ | 0 | 0 |
| 3.2 | 6.4 + 3.2 | 3.2 | 6 | 8 | L | 0.8 | 0.8 |
| 3.2 | 6.4 + 3.2 | 3.2 | 7 | 1 | L | 1.6 | 1.6 |
| 3.2 | 6.4 + 3.2 | 3.2 | 7 | 2 | ⌈ | 0 | 0 |
| 3.2 | 6.4 + 3.2 | 3.2 | 7 | 4 | Γ | 0.8 | 0.8 |
| 3.2 | 6.4 + 3.2 | 3.2 | 7 | 6 | L | 1.6 | 1.6 |
| 3.2 | 6.4 + 3.2 | 3.2 | 7 | 8 | ⌈ | 2.4 | 2.4 |
| 3.2 | 6.4 + 3.2 | 3.2 | 8 | 1 | Γ | 3.2 | 3.2 |
| 3.2 | 6.4 + 3.2 | 3.2 | 8 | 2 | Γ | 1.6 | 1.6 |
| 3.2 | 6.4 + 3.2 | 3.2 | 8 | 4 | L | 2.4 | 2.4 |
| 3.2 | 6.4 + 3.2 | 3.2 | 8 | 6 | ⌈ | 3.2 | 3.2 |
| 3.2 | 6.4 + 3.2 | 3.2 | 8 | 8 | Γ | 0 | 0 |
| 3.2 | 6.4 + 3.2 | 3.2 | 9 | 1 | ⌈ | 0.8 | 0.8 |
| 3.2 | 6.4 + 3.2 | 3.2 | 9 | 2 | L | 3.2 | 3.2 |
| 3.2 | 6.4 + 3.2 | 3.2 | 9 | 4 | ⌈ | 0 | 0 |
| 3.2 | 6.4 + 3.2 | 3.2 | 9 | 6 | Γ | 0.8 | 0.8 |
| 3.2 | 6.4 + 3.2 | 3.2 | 9 | 8 | ⌈ | 1.6 | 1.6 |
| 3.2 | 6.4 + 3.2 | 3.2 | 10 | 1 | ⌈ | 2.4 | 2.4 |
| 3.2 | 6.4 + 3.2 | 3.2 | 10 | 2 | ⌈ | 0.8 | 0.8 |
| 3.2 | 6.4 + 3.2 | 3.2 | 10 | 4 | ⌈ | 1.6 | 1.6 |
| 3.2 | 6.4 + 3.2 | 3.2 | 10 | 6 | L | 2.4 | 2.4 |
| 3.2 | 6.4 + 3.2 | 3.2 | 10 | 8 | ⌈ | 3.2 | 3.2 |
| 3.2 | 6.4 + 3.2 | 3.2 | 11 | 1 | Γ | 0 | 0 |
| 3.2 | 6.4 + 3.2 | 3.2 | 11 | 2 | ⌈ | 2.4 | 2.4 |
| 3.2 | 6.4 + 3.2 | 3.2 | 11 | 4 | L | 3.2 | 3.2 |
| 3.2 | 6.4 + 3.2 | 3.2 | 11 | 6 | ⌈ | 0 | 0 |
| 3.2 | 6.4 + 3.2 | 3.2 | 11 | 8 | Γ | 0.8 | 0.8 |
| 3.2 | 6.4 + 3.2 | 3.2 | 12 | 1 | ⌈ | 1.6 | 1.6 |
| 3.2 | 6.4 + 3.2 | 3.2 | 12 | 2 | L | 0 | 0 |
| 3.2 | 6.4 + 3.2 | 3.2 | 12 | 4 | ⌈ | 0.8 | 0.8 |
| 3.2 | 6.4 + 3.2 | 3.2 | 12 | 6 | Γ | 1.6 | 1.6 |
| 3.2 | 6.4 + 3.2 | 3.2 | 12 | 8 | ⌈ | 2.4 | 2.4 |
| 3.2 | 6.4 + 3.2 | 3.2 | 13 | 1 | L | 3.2 | 3.2 |
| 3.2 | 6.4 + 3.2 | 3.2 | 13 | 2 | ⌈ | 1.6 | 1.6 |
| 3.2 | 6.4 + 3.2 | 3.2 | 13 | 4 | Γ | 2.4 | 2.4 |
| 3.2 | 6.4 + 3.2 | 3.2 | 13 | 6 | L | 3.2 | 3.2 |
| 3.2 | 6.4 + 3.2 | 3.2 | 13 | 8 | ⌈ | 0 | 0 |
| 3.2 | 6.4 + 3.2 | 3.2 | 14 | 1 | Γ | 0.8 | 0.8 |
| 3.2 | 6.4 + 3.2 | 3.2 | 14 | 2 | Γ | 3.2 | 3.2 |
| 3.2 | 6.4 + 3.2 | 3.2 | 14 | 4 | L | 0 | 0 |
| 3.2 | 6.4 + 3.2 | 3.2 | 14 | 6 | ⌈ | 0.8 | 0.8 |
| 3.2 | 6.4 + 3.2 | 3.2 | 14 | 8 | Γ | 1.6 | 1.6 |
| 3.2 | 6.4 + 3.2 | 3.2 | 15 | 1 | ⌈ | 2.4 | 2.4 |
| 3.2 | 6.4 + 3.2 | 3.2 | 15 | 2 | L | 0.8 | 0.8 |
| 3.2 | 6.4 + 3.2 | 3.2 | 15 | 4 | ⌈ | 1.6 | 1.6 |
| 3.2 | 6.4 + 3.2 | 3.2 | 15 | 6 | Γ | 2.4 | 2.4 |
| 3.2 | 6.4 + 3.2 | 3.2 | 15 | 8 | ⌈ | 3.2 | 3.2 |
| 3.2 | 6.4 + 3.2 | 3.2 | 16 | 1 | L | 0 | 0 |
| 3.2 | 6.4 + 3.2 | 3.2 | 16 | 2 | ⌈ | 2.4 | 2.4 |
| 3.2 | 6.4 + 3.2 | 3.2 | 16 | 4 | Γ | 3.2 | 3.2 |
| 3.2 | 6.4 + 3.2 | 3.2 | 16 | 6 | ⌈ | 0 | 0 |
| 3.2 | 6.4 + 3.2 | 3.2 | 16 | 8 | L | 0.8 | 0.8 |

A person skilled in the art may know that various variations and replacements may be made to the foregoing table, and only some parameters in the foregoing table may be used for a particular scenario. Blank parameters in the foregoing table are parameters that do not need to be considered.

Preferably, to reduce calculation complexity, an L-LENGTH Rounding Error may be calculated not by simply using a formula, but instead, a simplified formula for calculating the L-LENGTH Rounding Error ($\Delta_{RE}$) is obtained according to a stored table.

Embodiment 6

For a 4× HE-LTF (duration is 12.8 microseconds+cp), a Rounding Error formula $\Delta_{RE}$ may be calculated according to a formula corresponding to parameters.

TABLE 8

| HESIGB CP | HE-LTF CP | DATA CP | Rounding Error formula $\Delta_{RE}$ |
|---|---|---|---|
| 0.8 us | 0.8 us | 0.8 us | $2.4 \times N_{LTF} + 2.4 \times N_{DATA} - \left\lfloor \dfrac{2.4 \times N_{LTF} + 2.4 \times N_{DATA}}{4} \right\rfloor \times 4$ |
| 1.6 us | 0.8 us | 0.8 us | $3.2 \times N_{SIGB} + 2.4 \times N_{LTF} + 2.4 \times N_{DATA} - \left\lfloor \dfrac{3.2 \times N_{SIGB} + 2.4 \times N_{LTF} + 2.4 \times N_{DATA}}{4} \right\rfloor \times 4$ |
| 1.6 us | 1.6 us | 1.6 us | $3.2 \times N_{SIGB} + 1.6 \times N_{LTF} + 1.6 \times N_{DATA} - \left\lfloor \dfrac{3.2 \times N_{SIGB} + 1.6 \times N_{LTF} + 1.6 \times N_{DATA}}{4} \right\rfloor \times 4$ |

TABLE 8-continued

| HESIGB CP | HE-LTF CP | DATA CP | Rounding Error formula $\Delta_{RE}$ |
|---|---|---|---|
| 0.8 us | 3.2 us | 3.2 us | 0 |
| 0.8 us | 1.6 us | 1.6 us | $1.6 \times N_{LTF} + 1.6 \times N_{DATA} - \left\lfloor \dfrac{1.6 \times N_{LTF} + 1.6 \times N_{DATA}}{4} \right\rfloor \times 4$ |
| 3.2 us | 3.2 us | 3.2 us | $1.6 \times N_{SIGB} - \left\lfloor \dfrac{1.6 \times N_{SIGB}}{4} \right\rfloor \times 4$ |
| 3.2 us | 1.6 us | 1.6 us | $1.6 \times N_{SIGB} + 1.6 \times N_{LTF} + 1.6 \times N_{DATA} - \left\lfloor \dfrac{1.6 \times N_{SIGB} + 1.6 \times N_{LTF} + 1.6 \times N_{DATA}}{4} \right\rfloor \times 4$ |

In the foregoing formulas, $N_{SIGB}$ is a quantity of symbols that are in an HE-SIGB included in a PPDU and that are different from a symbol in an HE-SIGA in terms of length; $N_{LTF}$ is a quantity of LTFs included in the PPDU; $N_{DATA}$ is a quantity of 4× OFDM symbols included in the PPDU, for example, 5n+0, 5n+1, ..., or 5n+4, where n is a nonnegative integer.

For a 2× HE-LTF (6.4 microseconds+cp) case, a Rounding Error formula $\Delta_{RE}$ may be calculated according to a formula corresponding to parameters.

TABLE 9

| HESIGB CP | HE-LTF CP | DATA CP | Rounding Error formula $\Delta_{RE}$ |
|---|---|---|---|
| 0.8 us | 0.8 us | 0.8 us | $0.8 \times N_{LTF} + 2.4 \times N_{DATA} - \left\lfloor \dfrac{0.8 \times N_{LTF} + 2.4 \times N_{DATA}}{4} \right\rfloor \times 4$ |
| 1.6 us | 0.8 us | 0.8 us | $3.2 \times N_{SIGB} + 0.8 \times N_{LTF} + 2.4 \times N_{DATA} - \left\lfloor \dfrac{3.2 \times N_{SIGB} + 0.8 \times N_{LTF} + 2.4 \times N_{DATA}}{4} \right\rfloor \times 4$ |
| 1.6 us | 1.6 us | 1.6 us | $3.2 \times N_{SIGB} + 1.6 \times N_{DATA} - \left\lfloor \dfrac{3.2 \times N_{SIGB} + 1.6 \times N_{DATA}}{4} \right\rfloor \times 4$ |
| 0.8 us | 3.2 us | 3.2 us | $2.4 \times N_{SIGB} - \left\lfloor \dfrac{2.4 \times N_{SIGB}}{4} \right\rfloor \times 4$ |
| 0.8 us | 1.6 us | 1.6 us | $1.6 \times N_{DATA} - \left\lfloor \dfrac{1.6 \times N_{DATA}}{4} \right\rfloor \times 4$ |
| 3.2 us | 3.2 us | 3.2 us | $1.6 \times N_{SIGB} + 2.4 \times N_{LTF} - \left\lfloor \dfrac{1.6 \times N_{SIGB} + 2.4 \times N_{LTF}}{4} \right\rfloor \times 4$ |
| 3.2 us | 1.6 us | 1.6 us | $1.6 \times N_{SIGB} + 1.6 \times N_{DATA} - \left\lfloor \dfrac{1.6 \times N_{SIGB} + 1.6 \times N_{DATA}}{4} \right\rfloor \times 4$ |

$N_{SIGB}$ is a quantity of symbols of an HE-SIGB that is different from an HE-SIGA in terms of symbol length, $N_{LTF}$ is a quantity of HE-LTFs, and $N_{DATA}$ is a quantity of 4× OFDM symbols.

At a receive end:

300. Receive a PPDU.

301. Parse the PPDU to obtain a quantity M1 of OFDM symbols transmitted by the PPDU.

Optionally, if a value of indication information is a first value, a value of M1 remains unchanged; or if a value of indication information is a second value, 1 is subtracted from M1.

Correspondingly, another implementation manner provides a PPDU transmission processing apparatus (not shown) that is applied to a wireless local area network and includes: a processing unit, where the PPDU includes a signal extension SE field, the SE field is after the last orthogonal frequency division multiplexing OFDM symbol that carries useful information, the PPDU includes indication information, the indication information is in a high efficiency signaling field HE-SIG, the indication information I is generated based on a symbol length of the SE field and is used to indicate whether a receive end needs to adjust a calculated quantity of OFDM symbols, and the indication information I may be obtained according to the methods in the foregoing implementation manners, details being not described herein again; and a sending unit, configured to send the PPDU. For a specific transmission method, refer to the methods in the foregoing implementation manners, and details are not described herein again.

Correspondingly, another implementation manner provides a PPDU transmission processing apparatus (not shown) that is applied to a wireless local area network and includes: a receiving unit, configured to receive a physical layer protocol data unit PPDU, where the PPDU includes a signal extension SE field, the SE field is after the last orthogonal frequency division multiplexing OFDM symbol that carries useful information, the PPDU includes indication information, the indication information is in a high efficiency signaling field HE-SIG, the indication information I is generated based on a symbol length of the SE field and is used to indicate whether a receive end needs to adjust a calculated quantity of OFDM symbols, and the indication information I may be obtained according to the methods in the foregoing implementation manners, details being not described herein again; and a processing unit, configured to: parse the PPDU, obtain, according to the indication information, a position at which decoding needs to be stopped, and stop decoding in the position at which decoding needs to be stopped.

The processing unit may be a general purpose processor, a digital signal processor, an application-specific integrated circuit, a field programmable gate array or another programmable logic device, a discrete gate or a transistor logic device, or a discrete hardware component, and can implement or perform the methods, steps, or logic block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. It should be easily understood that, when the PPDU transmission apparatus specifically sends a frame that includes a resource indication field, the PPDU transmission apparatus may be located in an access point; when the PPDU transmission apparatus specifically receives a frame that includes a resource indication field, the PPDU transmission apparatus may be located in a station.

Figure 8:
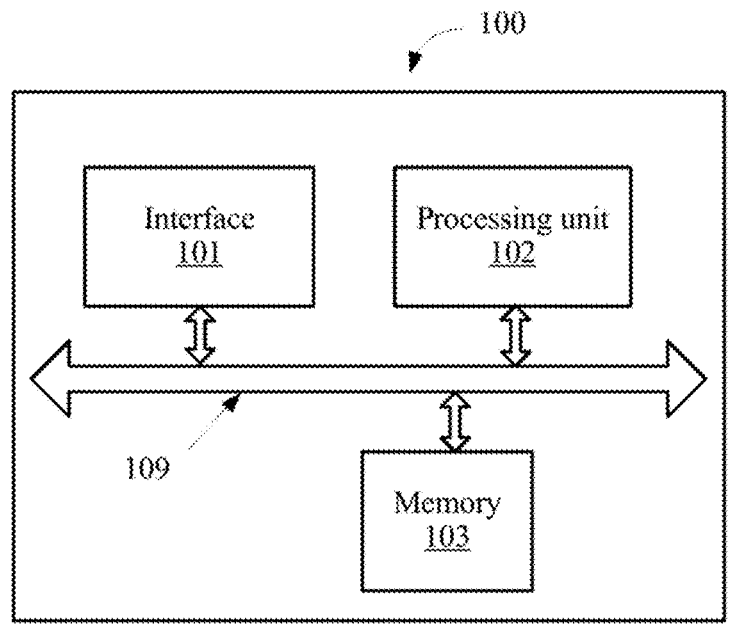
FIG. 8 is a simplified schematic diagram of an access point.

FIG. 8 is a block diagram of an access point 100 according to another embodiment of the present invention. The access point in FIG. 8 includes an interface 101, a processing unit 102, and a memory 103. The processing unit 102 controls an operation of the access point 100. The memory 103 may include a read-only memory and a random access memory, and provide an instruction and data to the processing unit 102. A part of the memory 103 may further include a non-volatile random access memory (NVRAM). All components of the access point 100 are coupled together by using a bus system 109. The bus system 109 includes a power supply bus, a control bus, and a status signal bus in addition to a data bus. However, for clarity of description, various buses are marked as the bus system 109 in the figure.

The PPDU sending method disclosed in the foregoing embodiments of the present invention may be applied to the processing unit 102, or may be implemented by the processing unit 102. In an implementation process, the steps in the foregoing method may be completed by using an integrated logic circuit of hardware in the processing unit 102 or an instruction in a form of software. The processing unit 102 may be a general purpose processor, a digital signal processor, an application-specific integrated circuit, a field programmable gate array or another programmable logic device, a discrete gate or a transistor logic device, or a discrete hardware component, and can implement or perform the methods, steps, or logic block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. The software module may be located in a random access memory, a flash memory, a read-only memory, a programmable read-only memory, an electrically erasable programmable memory, a register, or any other storage medium that is mature in the art. The storage medium is located in the memory 103, and the processing unit 102 reads information in the memory 103 and implements the steps in the foregoing methods in combination with hardware of the processing unit 112.

Figure 9:
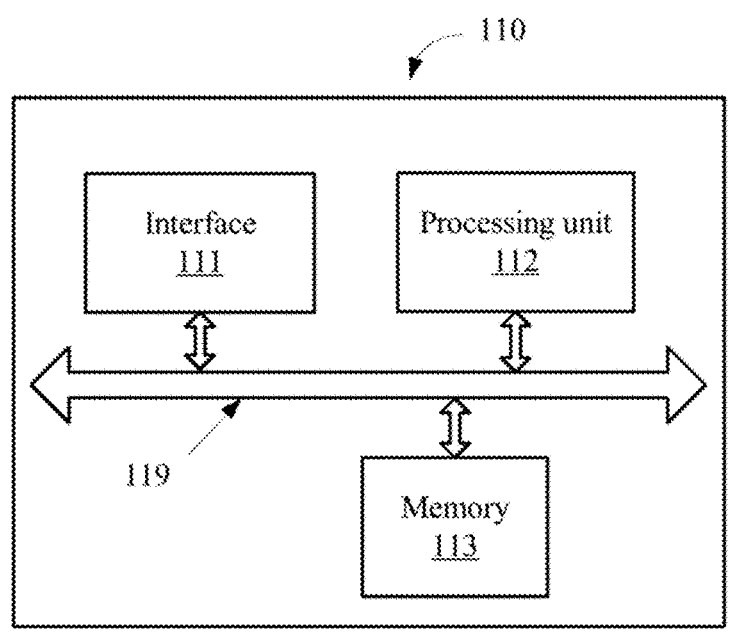
FIG. 9 is a simplified schematic diagram of a station.

FIG. 9 is a block diagram of a station 110 according to another embodiment of the present invention. The station in FIG. 9 includes an interface 111, a processing unit 112, and a memory 113. The processing unit 112 controls an operation of the station 110. The memory 113 may include a read-only memory and a random access memory, and provide an instruction and data to the processing unit 112. A part of the memory 113 may further include a non-volatile random access memory (NVRAM). All components of the station 110 are coupled together by using a bus system 119. The bus system 119 includes a power supply bus, a control bus, and a status signal bus in addition to a data bus. However, for clarity of description, various buses are marked as the bus system 119 in the figure.

The PPDU receiving method disclosed in the foregoing embodiments of the present invention may be applied to the processing unit 112, or may be implemented by the processing unit 112. In an implementation process, the steps in the foregoing method may be completed by using an integrated logic circuit of hardware in the processing unit 112 or an instruction in a form of software. The processing unit 112 may be a general purpose processor, a digital signal processor, an application-specific integrated circuit, a field programmable gate array or another programmable logic device, a discrete gate or a transistor logic device, or a discrete hardware component, and can implement or perform the methods, steps, or logic block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. The software module may be located in a random access memory, a flash memory, a read-only memory, a programmable read-only memory, an electrically erasable programmable memory, a register, or any other storage medium that is mature in the art. The storage medium is located in the memory 113, and the processing unit 112 reads information in the memory 113 and implements the steps in the foregoing methods in combination with hardware of the processing unit 112.

It should be understood that "an embodiment" or "the embodiment" mentioned in the entire specification means that particular features, structures, or characteristics related to the embodiment are included in at least one embodiment of the present invention.

Therefore, "in an embodiment" or "in an embodiment" that appears throughout the specification may not necessarily refer to a same embodiment. In addition, these particular features, structures, or characteristics may be combined in one or more embodiments in any appropriate manner. Sequence numbers of the foregoing processes do not mean execution sequences in various embodiments of the present invention. The execution sequences of the processes should be determined according to functions and internal logic of the processes, and should not constitute any limitation on implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

Based on the above, what is described above is merely examples of embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A physical layer protocol data unit transmission method, the method comprising:
   generating, by a transmit end, a physical layer protocol data unit (PPDU), wherein the PPDU comprises a signal extension (SE) field arranged after a last orthogonal frequency division multiplexing (OFDM) symbol of a plurality of OFDM symbols in the PPDU, wherein the PPDU comprises an ambiguity indication in a high efficiency signaling (HE-SIG) field, the ambiguity indication indicates whether a receive end needs to adjust a calculated quantity of the plurality of OFDM symbols;
   when $T_{SE}+\Delta_{RE}>(12.8+T_{GI})$ is satisfied, the ambiguity indication is a first value, and
   when $T_{SE}+\Delta_{RE}<(12.8+T_{GI})$ is satisfied, the ambiguity indication is a second value different from the first value,
   where $T_{SE}$ represents a transmission duration of the SE field,
   $\Delta_{RE}$ represents a difference between an actual transmission duration and an indicated transmission duration, and
   $T_{GI}$ represents a transmission duration of a cyclic prefix, wherein $(12.8+T_{GI})$ represents a transmission duration of a 4× OFDM symbol;
   sending, by the transmit end, the PPDU to the receive end.

2. The method according to claim 1, wherein the indicated transmission duration is indicated by L-Length in a preamble of the PPDU.

3. The method according to claim 2, wherein a value of the L-Length is:

$$L\_LENGTH = \left\lceil \frac{T_{L\_PREAMBLE} + T_{HE\_PREAMBLE} + T_{HE\_DATA} - 20}{4} \right\rceil \times 3 - 3 + m,$$

$$m = 1 \text{ or } 2; \text{ or}$$

$$L\_LENGTH = \left\lceil \frac{T_{L\_PREAMBLE} + T_{HE\_PREAMBLE} + T_{HE\_DATA} + T_{SE} - 20}{4} \right\rceil \times 3 - 3 + m, m = 1 \text{ or } 2$$

where m is a remainder of L-LENGTH modulo 3, $T_{HE\_DATA}=N\cdot(12.8+T_{GI})$ N being a quantity of 4× OFDM symbols that actually need to be transmitted, $T_{L\_PREAMBLE}$ represents a transmission duration of a L-preamble of the PPDU, and $T_{HE\_PREAMBLE}$ represents a transmission duration of a HE-preamble of the PPDU.

4. The method according to claim 1, wherein the ambiguity indication comprises one bit, the first value of the ambiguity indication is 1.

5. The method according to claim 1, wherein $\Delta_{RE}$=TXTIME*-TXTIME; and TXTIME* is the indicated transmission duration indicated by L-Length in a preamble of the PPDU, TXTIME is the actual transmission duration associated with the PPDU.

6. The method according to claim 5, wherein $$TXTIME = T_{L\_PREAMBLE} + T_{HE\_PREAMBLE} + T_{HE\_DATA} + T_{SE},$$

$$\text{and } TXTIME^* = \left\lceil \frac{T_{L\_PREAMBLE} + T_{HE\_PREAMBLE} + T_{HE\_DATA} + T_{SE} - 20}{4} \right\rceil \times 4 + 20;$$

$$\Delta_{RE} = TXTIME^* - TXTIME$$
$$= \left\lceil \frac{T_{L\_PREAMBLE} + T_{HE\_PREAMBLE} + T_{HE\_DATA} + T_{SE} - 20}{4} \right\rceil \times 4 + 20 -$$
$$(T_{L\_PREAMBLE} + T_{HE\_PREAMBLE} + T_{HE\_DATA} + T_{SE})$$
$$= \left\lceil \frac{T_{L\_PREAMBLE} + T_{HE\_PREAMBLE} + T_{HE\_DATA} + T_{SE}}{4} \right\rceil \times 4 -$$
$$(T_{L\_PREAMBLE} + T_{HE\_PREAMBLE} + T_{HE\_DATA} + T_{SE});$$

where $T_{HE\_DATA}=N\cdot(12.8+T_{GI})$, N being a quantity of 4× OFDM symbols that actually need to be transmitted, $T_{L\_PREAMBLE}$ represents a transmission duration of a L-preamble of the PPDU, and $T_{HE\_PREAMBLE}$ represents a transmission duration of a HE-preamble of the PPDU.

7. The method according to claim 5, wherein $$TXTIME = T_{L\_PREAMBLE} + T_{HE\_PREAMBLE} + T_{HE\_DATA} + T_{SE},$$

$$\text{and } TXTIME^* = \left\lceil \frac{T_{L\_PREAMBLE} + T_{HE\_PREAMBLE} + T_{HE\_DATA} + T_{SE} - 20}{4} \right\rceil \times 4 + 20;$$

-continued $$\Delta_{RE} = TXTIME^* - TXTIME$$
$$= \left\lceil \frac{T_{L\_PREAMBLE} + T_{HE\_PREAMBLE} + T_{HE\_DATA} + T_{SE} - 20}{4} \right\rceil \times 4 + 20 -$$
$$(T_{L\_PREAMBLE} + T_{HE\_PREAMBLE} + T_{HE\_DATA} + T_{SE})$$
$$= \left\lceil \frac{T_{L\_PREAMBLE} + T_{HE\_PREAMBLE} + T_{HE\_DATA} + T_{SE}}{4} \right\rceil \times 4 -$$
$$(T_{L\_PREAMBLE} + T_{HE\_PREAMBLE} + T_{HE\_DATA} + T_{SE});$$

where $T_{HE\_DATA}=N\cdot(12.8+T_{GI})$, N being a quantity of 4× OFDM symbols that actually need to be transmitted, $T_{L\_PREAMBLE}$ represents a transmission duration of a L-preamble of the PPDU, and $T_{HE\_PREAMBLE}$ represents a transmission duration of a HE-preamble of the PPDU.

8. A physical layer protocol data unit receiving method, comprising:

receiving, by a receive end, a physical layer protocol data unit (PPDU), wherein the PPDU comprises a signal extension (SE) field arranged after a last orthogonal frequency division multiplexing (OFDM) symbol of a plurality of OFDM symbols in the PPDU, wherein the PPDU comprises an ambiguity indication in a high efficiency signaling (HE-SIG) field, the ambiguity indication indicates whether the receive end needs to adjust a calculated quantity of the plurality of OFDM symbols;

parsing the PPDU to determine a quantity M of the plurality of OFDM symbols carried in the PPDU; and determining whether to adjust the determined quantity M based on the ambiguity indication of the PPDU, wherein when a value of the ambiguity indication is a first value, $T_{SE}+\Delta_{RE}>(12.8+T_{GI})$ is satisfied, and when a value of the ambiguity indication is a second value, $T_{SE}+\Delta_{RE}<(12.8+T_{GI})$ is satisfied, the second value being different from the first value, where $T_{SE}$ represents a transmission duration of the SE field; $\Delta_{RE}$ represents a difference between an actual transmission duration and an indicated transmission duration, and $T_{GI}$ represents a transmission duration of a cyclic prefix, wherein $(12.8+T_{GI})$ represents a transmission duration of a 4× OFDM symbol.

9. The method according to claim 8, wherein determining whether to adjust the determined quantity M based on the ambiguity indication of the PPDU comprises:

keeping a value of the determined quantity M unchanged when the value of the ambiguity indication is the first value; and subtracting 1 from the determined quantity M when the value of the ambiguity indication is the second value.

10. The method according to claim 8, wherein the ambiguity indication comprises one bit, the first value of the ambiguity indication is 1.

11. A physical layer protocol data unit transmission apparatus, the apparatus comprising:

at least one processor; and a non-transitory computer-readable storage medium coupled to the at least one processor and storing programming instructions for execution by the at least one processor, wherein the programming instructions instruct the apparatus to:

generate a physical layer protocol data unit (PPDU), wherein the PPDU comprises a signal extension (SE)

field arranged after a last orthogonal frequency division multiplexing (OFDM) symbol of a plurality of OFDM symbols, wherein the PPDU comprises an ambiguity indication in a high efficiency signaling (HE-SIG) field, the ambiguity indication indicates whether a receive end needs to adjust a calculated quantity of the plurality of OFDM symbols; and send the PPDU to the receive end;

when $T_{SE}+\Delta_{RE}>(12.8+T_{GI})$ is satisfied, the ambiguity indication is a first value; and when $T_{SE}+\Delta_{RE}<(12.8+T_{GI})$ is satisfied, the ambiguity indication is a second value different from the first value, where $T_{SE}$ represents a transmission duration of the SE field, $\Delta_{RE}$ represents a difference between an actual transmission duration and an indicated transmission duration, and $T_{GI}$ represents a transmission duration of a cyclic prefix, wherein $(12.8+T_{GI})$ represents a transmission duration of a 4× OFDM symbol.

12. The apparatus according to claim 11, configured to be an access point in a wireless local area network,
wherein the access point comprises a network interface coupled to the at least one processor.

13. The apparatus according to claim 11, wherein the indicated transmission duration is indicated by L-Length in a preamble of the PPDU.

14. The apparatus according to claim 13, wherein a value of the L-Length is:

L_LENGTH =
$$\left\lceil \frac{T_{L\_PREAMBLE} + T_{HE\_PREAMBLE} + T_{HE\_DATA} - 20}{4} \right\rceil \times 3 - 3 + m,$$

$m = 1 \text{ or } 2$; or

L_LENGTH =
$$\left\lceil \frac{T_{L\_PREAMBLE} + T_{HE\_PREAMBLE} + T_{HE\_DATA} + T_{SE} - 20}{4} \right\rceil \times 3 - 3 + m, m = 1 \text{ or } 2$$

where m is a remainder of L-LENGTH modulo 3, $T_{HE\_DATA}=N\cdot(12.8+T_{GI})$ N being a quantity of 4× OFDM symbols that actually need to be transmitted, $T_{L\_PREAMBLE}$ represents a transmission duration of a L-preamble of the PPDU, and $T_{HE\_PREAMBLE}$ represents a transmission duration of a HE-preamble of the PPDU.

15. The apparatus according to claim 11, wherein the ambiguity indication comprises one bit, the first value of the ambiguity indication is 1.

16. The apparatus according to claim 11, wherein $\Delta_{RE}$=TXTIME*-TXTIME; and TXTIME* is the indicated transmission duration indicated by L-Length included in a preamble of the PPDU, TXTIME is the actual transmission duration associated with the PPDU.

17. The apparatus according to claim 16, wherein $TXTIME = T_{L\_PREAMBLE} + T_{HE\_PREAMBLE} + T_{HE\_DATA} + T_{SE},$ and $TXTIME^* =$ $$\left\lceil \frac{T_{L\_PREAMBLE} + T_{HE\_PREAMBLE} + T_{HE\_DATA} + T_{SE} - 20}{4} \right\rceil \times 4 + 20;$$

$\Delta_{RE} = TXTIME^* - TXTIME$ $= \left\lceil \frac{T_{L\_PREAMBLE} + T_{HE\_PREAMBLE} + T_{HE\_DATA} + T_{SE} - 20}{4} \right\rceil \times 4 + 20 -$ $(T_{L\_PREAMBLE} + T_{HE\_PREAMBLE} + T_{HE\_DATA} + T_{SE})$ $= \left\lceil \frac{T_{L\_PREAMBLE} + T_{HE\_PREAMBLE} + T_{HE\_DATA} + T_{SE}}{4} \right\rceil \times 4 -$ $(T_{L\_PREAMBLE} + T_{HE\_PREAMBLE} + T_{HE\_DATA} + T_{SE});$ where $T_{HE\_DATA}=N\cdot(12.8+T_{GI})$, N being a quantity of 4× OFDM symbols that actually need to be transmitted, $T_{L\_PREAMBLE}$ represents a transmission duration of a L-preamble of the PPDU, and $T_{HE\_PREAMBLE}$ represents a transmission duration of a HE-preamble of the PPDU.

18. The apparatus according to claim 16, wherein $TXTIME=T_{L\_PREAMBLE}+T_{HE\_PREAMBLE}+T_{HE\_DATA},$ $TXTIME = T_{L\_PREAMBLE} + T_{HE\_PREAMBLE} + T_{HE\_DATA} + T_{SE},$ and $TXTIME^* =$ $$\left\lceil \frac{T_{L\_PREAMBLE} + T_{HE\_PREAMBLE} + T_{HE\_DATA} + T_{SE} - 20}{4} \right\rceil \times 4 + 20;$$

$\Delta_{RE} = TXTIME^* - TXTIME$ $= \left\lceil \frac{T_{L\_PREAMBLE} + T_{HE\_PREAMBLE} + T_{HE\_DATA} + T_{SE} - 20}{4} \right\rceil \times 4 + 20 -$ $(T_{L\_PREAMBLE} + T_{HE\_PREAMBLE} + T_{HE\_DATA} + T_{SE})$ $= \left\lceil \frac{T_{L\_PREAMBLE} + T_{HE\_PREAMBLE} + T_{HE\_DATA} + T_{SE}}{4} \right\rceil \times 4 -$ $(T_{L\_PREAMBLE} + T_{HE\_PREAMBLE} + T_{HE\_DATA} + T_{SE});$ where $T_{HE\_DATA}=N\cdot(12.8+T_{GI})$, N being a quantity of 4× OFDM symbols that actually need to be transmitted, $T_{L\_PREAMBLE}$ represents a transmission duration of a L-preamble of the PPDU, and $T_{HE\_PREAMBLE}$ represents a transmission duration of a HE-preamble of the PPDU.

19. A physical layer protocol data unit receiving apparatus, comprising:

at least one processor; and a non-transitory computer-readable storage medium coupled to the at least one processor and storing programming instructions for execution by the at least one processor, wherein the programming instructions instruct the apparatus to:

receive a physical layer protocol data unit (PPDU), wherein the PPDU comprises a signal extension (SE) field arranged after a last orthogonal frequency division multiplexing (OFDM) symbol of a plurality of OFDM symbols, wherein the PPDU comprises an ambiguity indication in a high efficiency signaling (HE-SIG) field, the ambiguity indication indicates whether a receive end needs to adjust a calculated quantity of the plurality of OFDM symbols;

parse the PPDU to determine a quantity M of the plurality of OFDM symbols carried in the PPDU; and determine whether to adjust the determined quantity M based on the ambiguity indication of the PPDU, wherein when a value of the ambiguity indication is a first value, $T_{SE}+\Delta_{RE}>(12.8+T_{GI})$ is satisfied, and when a value of the ambiguity indication is a second value, $T_{SE}+\Delta_{RE}<(12.8+T_{GI})$ is satisfied, the second value being different from the first value, where $T_{SE}$ represents a duration of the SE field, $\Delta_{RE}$ represents a difference between an actual transmission duration and an indicated transmission duration, and $T_{GI}$ represents a transmission duration of a cyclic prefix, wherein $(12.8+T_{GI})$ represents a transmission duration of a 4× OFDM symbol.

20. The apparatus according to claim 19, wherein the programming instructions instruct the at least one processor to:

keep a value of the determined quantity M unchanged when the ambiguity indication is the first value, and subtract 1 from the determined quantity M when the ambiguity indication is the second value.

21. The apparatus according to claim 19, configured to be a station in a wireless local area network, wherein the station comprises a network interface coupled to the at least one processor.

22. The apparatus according to claim 19, wherein the ambiguity indication comprises one bit, the first value of the ambiguity indication is 1.

* * * * *

UNITED STATES PATENT AND TRADEMARK OFFICE
CERTIFICATE OF CORRECTION

PATENT NO. : 10,461,978 B2
APPLICATION NO. : 15/834435
DATED : October 29, 2019
INVENTOR(S) : Meilu Lin and Yun Liu Page 1 of 2

It is certified that error appears in the above-identified patent and that said Letters Patent is hereby corrected as shown below:

In the Claims

In Column 25, Line 21, in Claim 3, after "(12.8+TGI)" insert -- , --.

In Column 25, Line 62, in Claim 7, delete "THE_DATA + TSE," and insert -- THE_DATA, --, therefor.

In Column 25, Line 63, in Claim 7, before "TXTIME*" delete "and".

In Column 25, Line 65, in Claim 7, after "THE_DATA" delete "+ TSE".

In Column 26, Line 4, in Claim 7, after "THE_DATA" delete "+ TSE".

In Column 26, Line 6, in Claim 7, delete "THE_DATA + TSE)" and insert -- THE_DATA) --, therefor.

In Column 26, Line 7, in Claim 7, after "THE_DATA" delete "+ TSE".

In Column 26, Line 9, in Claim 7, delete "THE_DATA + TSE);" and insert -- THE_DATA); --, therefor.

In Column 27, Line 12, in Claim 11, delete "TGI)is" and insert -- TGI) is --, therefor.

In Column 27, Line 47, in Claim 14, after "(12.8+TGI)" insert -- , --.

In Column 28, Line 16, in Claim 17, delete "TL_PREAMBLErepresents" and insert -- TL_PREAMBLE represents --, therefor.

In Column 28, Line 17, in Claim 17, delete "THE_PREAMBLErepresents" and insert -- THE_PREAMBLE represents --, therefor.

Signed and Sealed this
Eighteenth Day of February, 2020

Andrei Iancu
*Director of the United States Patent and Trademark Office*

CERTIFICATE OF CORRECTION (continued)
U.S. Pat. No. 10,461,978 B2

In Column 28, Line 24, in Claim 18, delete "THE_DATA + TSE," and insert -- THE_DATA, --, therefor.

In Column 28, Line 25, in Claim 18, before "TXTIME*" delete "and".

In Column 28, Line 26, in Claim 18, after "THE_DATA" delete "+ TSE".

In Column 28, Line 31, in Claim 18, after "THE_DATA" delete "+ TSE".

In Column 28, Line 33, in Claim 18, delete "THE_DATA + TSE)" and insert -- THE_DATA) --, therefor.

In Column 28, Line 34, in Claim 18, after "THE_DATA" delete "+ TSE".

In Column 28, Line 36, in Claim 18, delete "THE_DATA + TSE);" and insert -- THE_DATA); --, therefor.